(12) United States Patent
Vadapalli et al.

(10) Patent No.: US 11,595,940 B1
(45) Date of Patent: Feb. 28, 2023

(54) PAGING COLLISION AVOIDANCE IN A MULTI-SUBSCRIBER IDENTITY MODULE (MSIM) USER EQUIPMENT, AND ASSOCIATED DEVICES, SYSTEMS, AND METHODS

(71) Applicant: QUALCOMM INCORPORATED, San Diego, CA (US)

(72) Inventors: Syam Pavan Vadapalli, Visakhapatnam (IN); Ankammarao Ravuvari, Hyderabad (IN); Roop Sagar Inakollu, Nellore (IN); Parshu Ramulu Chintakindi, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/449,454

(22) Filed: Sep. 29, 2021

(51) Int. Cl.
*H04W 68/00* (2009.01)
*H04W 16/28* (2009.01)
(Continued)

(52) U.S. Cl.
CPC ......... *H04W 68/005* (2013.01); *H04W 16/28* (2013.01); *H04W 56/001* (2013.01); *H04W 60/04* (2013.01)

(58) Field of Classification Search
CPC . H04W 68/005; H04W 16/28; H04W 56/001; H04W 60/04
(Continued)

(56) References Cited

U.S. PATENT DOCUMENTS

| 9,066,330 B2* | 6/2015 | Hang | H04W 76/19 |
| 2018/0115978 A1* | 4/2018 | Shi | H04W 72/10 |

(Continued)

FOREIGN PATENT DOCUMENTS

| EP | 3742831 A1 | 11/2020 |
| EP | 4030837 A1 | 7/2022 |

(Continued)

OTHER PUBLICATIONS

Apple Inc: "MUSIM Paging Collision Avoidance", 3GPP TSG-RAN WG2 Meeting # 114 Electronic, R2-2105084, 3rd Generation Partnership Project, Mobile Competence Centre, 650, Route Des Lucioles, F-06921 Sophia-Antipolis Cedex, France, vol. RAN WG2, No. Online, May 19, 2021-May 27, 2021, May 11, 2021, 4 Pages, XP052006779, 4. Appendix.

(Continued)

*Primary Examiner* — Nghi H Ly
(74) *Attorney, Agent, or Firm* — Haynes and Boone, LLP

(57) ABSTRACT

Various aspects of the present disclosure generally relate to wireless communication. In one aspect, a method of wireless communication performed by a user equipment (UE) includes: monitoring, on a non-dedicated data subscription (n-DDS) of the UE, for one or more first paging messages based on a first paging configuration; receiving, from a base station (BS) on a dedicated data subscription (DDS) of the UE, system information indicating a second paging configuration; and transmitting, to the BS on the DDS, a registration update request based on the first paging configuration and the second paging configuration; receiving, from the BS based on the registration update request, a registration update; and monitoring, on the DDS of the UE, for one or more second paging messages based on a third paging configuration different from the second paging configuration, wherein the third paging configuration is based on the registration update.

30 Claims, 9 Drawing Sheets

(51) Int. Cl.
*H04W 56/00* (2009.01)
*H04W 60/04* (2009.01)

(58) Field of Classification Search
USPC .......... 370/329, 328, 338, 341, 345, 350
See application file for complete search history.

(56) References Cited

U.S. PATENT DOCUMENTS

2020/0304984 A1* 9/2020 Dhanapal .............. H04W 76/19
2022/0124609 A1* 4/2022 Asthana ................ H04W 48/18

FOREIGN PATENT DOCUMENTS

| WO | 2020243265 A1 | 12/2020 |
| WO | 2021062822 A1 | 4/2021 |

OTHER PUBLICATIONS

International Search Report and Written Opinion—PCT/US2022/044219—ISA/EPO—dated Dec. 21, 2022.
Nokia, et al., "RAN Impacts for Paging Collision Avoidance Solutions for Multi-SIM", 3GPP TSG-RAN WG2 Meeting #114 Electronic, R2-2105227, 3rd Generation Partnership Project, Mobile Competence Centre, 650, Route Des Lucioles, F-06921 Sophia-Antipolis Cedex, France, vol. RAN WG2, No. Electronic, May 19, 2021-May 27, 2021, May 10, 2021, 3 Pages, XP052003801, 2 Discsussion.
Nokia, et al., "RAN Impacts of Solutions for Paging Collision Avoidance", 3GPP TSG-RAN WG2 Meeting #113 Electronic, R2-2100507, 3rd Generation Partnership Project, Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 14, 2021, 4 Pages, XP051972668, 2 Discsussion.

\* cited by examiner

PAGING COLLISION AVOIDANCE IN A MULTI-SUBSCRIBER IDENTITY MODULE (MSIM) USER EQUIPMENT, AND ASSOCIATED DEVICES, SYSTEMS, AND METHODS

FIELD OF THE DISCLOSURE

Aspects of the present disclosure generally relate to wireless communication and to techniques and apparatuses for avoiding collisions between paging occasions of different subscriptions in a multi-subscriber identity module user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies, including those applicable to other multiple access technologies and the telecommunication standards that employ these technologies.

SUMMARY

The following summarizes some aspects of the present disclosure to provide a basic understanding of the discussed technology. This summary is not an extensive overview of all contemplated features of the disclosure and is intended neither to identify key elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects generally include a method, apparatus, system, computer program product, non-transitory computer-readable medium, user equipment, base station, wireless communication device, and/or processing system as substantially described herein with reference to and as illustrated by the accompanying drawings and specification.

According to one aspect of the present disclosure, a method of wireless communication performed by a user equipment (UE) includes: monitoring, on a non-dedicated data subscription (n-DDS) of the UE, for one or more first paging messages based on a first paging configuration; receiving, from a base station (BS) on a dedicated data subscription (DDS) of the UE, system information indicating a second paging configuration; and transmitting, to the BS on the DDS, a registration update request based on the first paging configuration and the second paging configuration; receiving, from the BS based on the registration update request, a registration update; and monitoring, on the DDS of the UE, for one or more second paging messages based on a third paging configuration different from the second paging configuration, wherein the third paging configuration is based on the registration update.

According to another aspect of the present disclosure, a user equipment (UE) includes: a memory; a transceiver; and at least one processor operatively coupled to the memory and the transceiver and configured to: monitor, on a non-dedicated data subscription (n-DDS) of the UE, for one or more first paging messages based on a first paging configuration; receive, from a base station (BS) on a dedicated data subscription (DDS) of the UE, system information indicating a second paging configuration; and transmit, to the BS on the DDS, a registration update request based on the first paging configuration and the second paging configuration; receive, from the BS based on the registration update request, a registration update; and monitor, on the DDS of the UE, for one or more second paging messages based on a third paging configuration different from the second paging configuration, wherein the third paging configuration is based on the registration update.

According to another aspect of the present disclosure, a non-transitory, computer-readable medium has program code recorded thereon, where the program code comprises instructions executable by a user equipment (UE) to cause the UE to: monitor, on a non-dedicated data subscription (n-DDS) of the UE, for one or more first paging messages based on a first paging configuration; receive, from a base station (BS) on a dedicated data subscription (DDS) of the UE, system information indicating a second paging configuration; and transmit, to the BS on the DDS, a registration update request based on the first paging configuration and the second paging configuration; receive, from the BS based on the registration update request, a registration update; and monitor, on the DDS of the UE, for one or more second paging messages based on a third paging configuration different from the second paging configuration, wherein the third paging configuration is based on the registration update.

According to another aspect of the present disclosure, a user equipment (UE) includes: means for monitoring, on a non-dedicated data subscription (n-DDS) of the UE, for one or more first paging messages based on a first paging configuration; means for receiving, from a base station (BS) on a dedicated data subscription (DDS) of the UE, system information indicating a second paging configuration; and means for transmitting, to the BS on the DDS, a registration update request based on the first paging configuration and the second paging configuration; means for receiving, from the BS based on the registration update request, a registration update; and means for monitoring, on the DDS of the UE, for one or more second paging messages based on a third paging configuration different from the second paging configuration, wherein the third paging configuration is based on the registration update.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
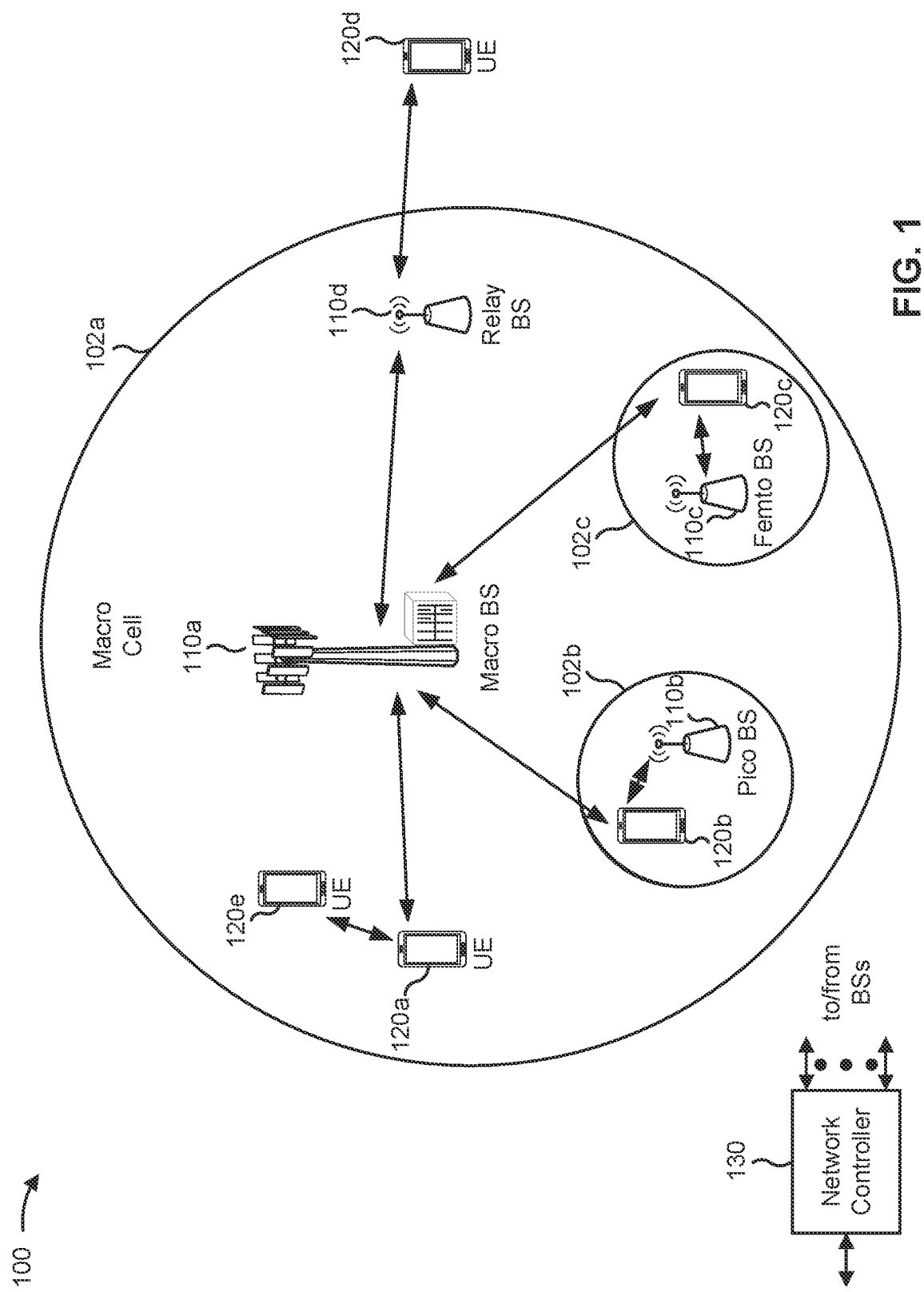
FIG. 1 is a diagram illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

In some aspects, a multi-subscriber identity module (MSIM) wireless communication device may be configured to communicate with one or more networks using two or more subscriptions. For example, an MSIM user equipment (UE) may be configured to communicate with the one or more networks using a dedicated data subscription (DDS) and a non-dedicated data subscription (n-DDS). The DDS may be used for receiving data services from the network in an active or connected mode, while the n-DDS may be used in an idle mode and may be used for periodically monitoring for paging messages to conserve power. For example, the n-DDS may be configured to periodically monitor during one or more paging occasions. The MSIM UE may be configured with tune-away gaps for the DDS during the n-DDS paging occasions to avoid potential collisions while the MSIM UE is in connected mode on the DDS.

In some aspects, the MSIM UE may also determine to enter an idle mode for the DDS. The MSIM UE may use RRC signaling to indicate to the network that the MSIM UE will enter idle mode on the DDS. The MSIM UE may receive, from a base station, system information indicating one or more parameters associated with a paging configuration for monitoring for paging messages. In some aspects, the MSIM UE may not detect collisions until after the MSIM UE has entered the idle mode on the DDS. Accordingly, the MSIM UE may not detect a paging collision until after it has occurred, which may cause a loss of paging messages for the n-DDS and/or paging messages for the DDS. The loss of page messages may manifest to the user as higher latency and degraded MSIM UE performance.

The present disclosure describes mechanisms for proactively detecting and avoiding potential collisions based on monitoring configurations associated with each subscription of an MSIM UE. For example, a UE, while in connected mode on a DDS, may receive system information (e.g., SIB) indicating a paging configuration or a parameter for monitoring paging occasions on the DDS. The UE may decode the system information to determine the paging occasions and/or PDCCH monitoring occasions to determine whether one or more paging occasions may potentially collide. If a potential paging collision is detected, the UE may initiate a registration update by transmitting a registration update request to the BS. The BS may respond by transmitting a registration update to the UE. The registration update may include or indicate a temporary identifier. For example, the registration update may include an updated 5G global unique temporary identifier (GUTI) or other temporary network identifier. The UE may then update the paging configuration for the DDS before the potential collision occurs. Thus, the DDS may proactively resolve the potential collision before entering the idle mode and before monitoring for paging message. The mechanisms, devices, and aspects of the present disclosure may reduce the occurrence of collisions for MSIM UEs, which may reduce latency on one or both subscriptions, improve network performance, use network resources more efficiently, conserve UE power, and/or otherwise improve the user experience.

FIG. 1 illustrates a wireless communication network 100 according to some aspects of the present disclosure. The network 100 may be a 5G network. The network 100 includes a number of base stations (BSs) 110 (individually labeled as 110a, 110b, 110c, 110d, 110e, and 110f) and other network entities. A BS 110 may be a station that communicates with UEs 120 and may also be referred to as an evolved node B (eNB), a next generation eNB (gNB), an access point, and the like. Each BS 110 may provide communication coverage for a particular geographic area. In 3GPP, the term "cell" can refer to this particular geographic coverage area of a BS 110 and/or a BS subsystem serving the coverage area, depending on the context in which the term is used.

A BS 110 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110d and 110e may be regular macro BSs, while the BSs 110a-110c may be macro BSs enabled with one of three dimension (3D), full dimension (HD), or massive MIMO. The BSs 110a-110c may take advantage of their higher dimension MIMO capabilities to exploit 3D beamforming in both elevation and azimuth beamforming to increase coverage and capacity. The BS 110f may be a small cell BS which may be a home node or portable access point. A BS 110 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless network 100, and each UE 120 may be stationary or mobile. A UE 120 may also be referred to as a terminal, a mobile station, a subscriber unit, a station, or the like. A UE 120 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 120 may be a device that includes a Universal Integrated Circuit Card (UICC). In another aspect, a UE may be a device that does not include a UICC. In some aspects, the UEs 120 that do not include UICCs may also be referred to as IoT devices or internet of everything (IoE) devices. The UEs 120a-120d are examples of mobile smart phone-type devices accessing network 100. A UE 120 may also be a machine specifically configured for connected communication, including machine type communication (MTC), enhanced MTC (eMTC), narrowband IoT (NB-IoT) and the like. The UEs 120e-120h are examples of various machines configured for communication that access the network 100. The UEs 120i-120k are examples of vehicles equipped with wireless communication devices configured for communication that access the network 100. A UE 120 may be able to communicate with any type of the BSs, whether macro BS, small cell, or the like. In FIG. 1, a lightning bolt (e.g., communication links) indicates wireless transmissions between a UE 120 and a serving BS 110, which is a BS designated to serve the UE 120 on the downlink (DL) and/or uplink (UL), desired transmission between BSs 110, backhaul transmissions between BSs, or sidelink transmissions between UEs 120.

In operation, the BSs 110a-110c may serve the UEs 120a and 120b using 3D beamforming and coordinated spatial techniques, such as coordinated multipoint (CoMP) or multi-connectivity. The macro BS 110d may perform backhaul communications with the BSs 110a-110c, as well as small cell, the BS 110f. The macro BS 110d may also transmit multicast services which are subscribed to and received by the UEs 120c and 120d. Such multicast services may include mobile television or stream video, or may include other services for providing community information, such as weather emergencies or alerts, such as Amber alerts or gray alerts.

The BSs 110 may also communicate with a core network. The core network may provide user authentication, access authorization, tracking, Internet Protocol (IP) connectivity, and other access, routing, or mobility functions. At least some of the BSs 110 (e.g., which may be an example of a gNB or an access node controller (ANC)) may interface with the core network through backhaul links (e.g., NG-C, NG-U, etc.) and may perform radio configuration and scheduling for communication with the UEs 120. In various examples, the BSs 110 may communicate, either directly or indirectly (e.g., through core network), with each other over backhaul links (e.g., X1, X2, etc.). The backhaul links may be wired or wireless communication links.

The network 100 may also support communications with ultra-reliable and redundant links for devices, such as the UE 120e, which may be a drone. Redundant communication links with the UE 120e may include links from the macro BSs 110d and 110e, as well as links from the small cell BS 110f. Other machine type devices, such as the UE 120f (e.g., a thermometer), the UE 120g (e.g., smart meter), and UE 120h (e.g., wearable device) may communicate through the network 100 either directly with BSs, such as the small cell BS 110f, and the macro BS 110e, or in multi-step-size configurations by communicating with another user device which relays its information to the network, such as the UE 120f communicating temperature measurement information to the smart meter, the UE 120g, which is then reported to the network through the small cell BS 110f. The network 100 may also provide additional network efficiency through dynamic, low-latency TDD/FDD communications, such as V2V, V2X, C-V2X communications between a UE 120i, 120j, or 120k and other UEs 120, and/or vehicle-to-infrastructure (V2I) communications between a UE 120i, 120j, or 120k and a BS 110.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 110 can assign or schedule transmission resources (e.g., in the form of time-frequency resource blocks (RB)) for downlink (DL) and uplink (UL) transmissions in the network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell specific reference signals (CRSs) and/or channel state information-reference signals (CSI-RSs) to enable a UE 120 to estimate a DL channel. Similarly, a UE 120 may transmit sounding reference signals (SRSs) to enable a BS 110 to estimate a UL channel Control information may include resource assignments and protocol controls. Data may include protocol data and/or operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be a NR network deployed over a licensed spectrum. The BSs 110 can transmit synchronization signals (e.g., including a primary synchronization signal (PSS) and a secondary synchronization signal (SSS)) in the network 100 to facilitate synchronization. The BSs 110 can broadcast system information associated with the network 100 (e.g., including a master information block (MIB), remaining system information (RMSI), and other system information (OSI)) to facilitate initial network access. In some instances, the BSs 110 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 120 attempting to access the network 100 may perform an initial cell search by detecting a PSS from a BS 110. The PSS may enable synchronization of period timing and may indicate a physical layer identity value. The UE 120 may then receive a SSS. The SSS may enable radio frame synchronization, and may provide a cell identity value. The cell identity value may be combined with the physical layer identity value to identify the cell. The PSS and the SSS may be located in a central portion of a carrier or any suitable frequencies within the carrier.

After receiving the PSS and SSS, the UE 120 may receive a MIB. The MIB may include system information for initial network access and scheduling information for RMSI and/or OSI. After decoding the MIB, the UE 120 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 120 can perform a random access procedure to establish a connection with the BS 110. In some examples, the random access procedure may be a four-step random access procedure. For example, the UE 120 may transmit a random access preamble and the BS 110 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 120 may transmit a connection request to the BS 110 and the BS 110 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a random access preamble and a connection request in a single transmission and the BS 110 may respond by transmitting a random access response and a connection response in a single transmission.

After establishing a connection, the UE 120 and the BS 110 can enter a normal operation stage, where operational data may be exchanged. For example, the BS 110 may schedule the UE 120 for UL and/or DL communications. The BS 110 may transmit UL and/or DL scheduling grants to the UE 120 via a PDCCH. The scheduling grants may be transmitted in the form of DL control information (DCI). The BS 110 may transmit a DL communication signal (e.g., carrying data) to the UE 120 via a PDSCH according to a DL scheduling grant. The UE 120 may transmit a UL communication signal to the BS 110 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 110 may dynamically assign a UE 120 to operate over a certain BWP (e.g., a certain portion of the system BW). The assigned BWP may be referred to as the active BWP. The UE 120 may monitor the active BWP for signaling information from the BS 110. The BS 110 may schedule the UE 120 for UL or DL communications in the active BWP. In some aspects, a BS 110 may assign a pair of BWPs within the CC to a UE 120 for UL and DL communications. For example, the BWP pair may include one BWP for UL communications and one BWP for DL communications.

In some aspects, the network 100 may be an NR network supporting carrier aggregation (CA) of component carriers (CCs) in which more than one cell can be activated to support DL/UL transmissions. Each cell may correspond to a different CC, and may be within a same frequency band or within different frequency bands.

As indicated above, FIG. 1 is provided as an example. Other examples may differ from what is described with regard to FIG. 1.

Figure 2:
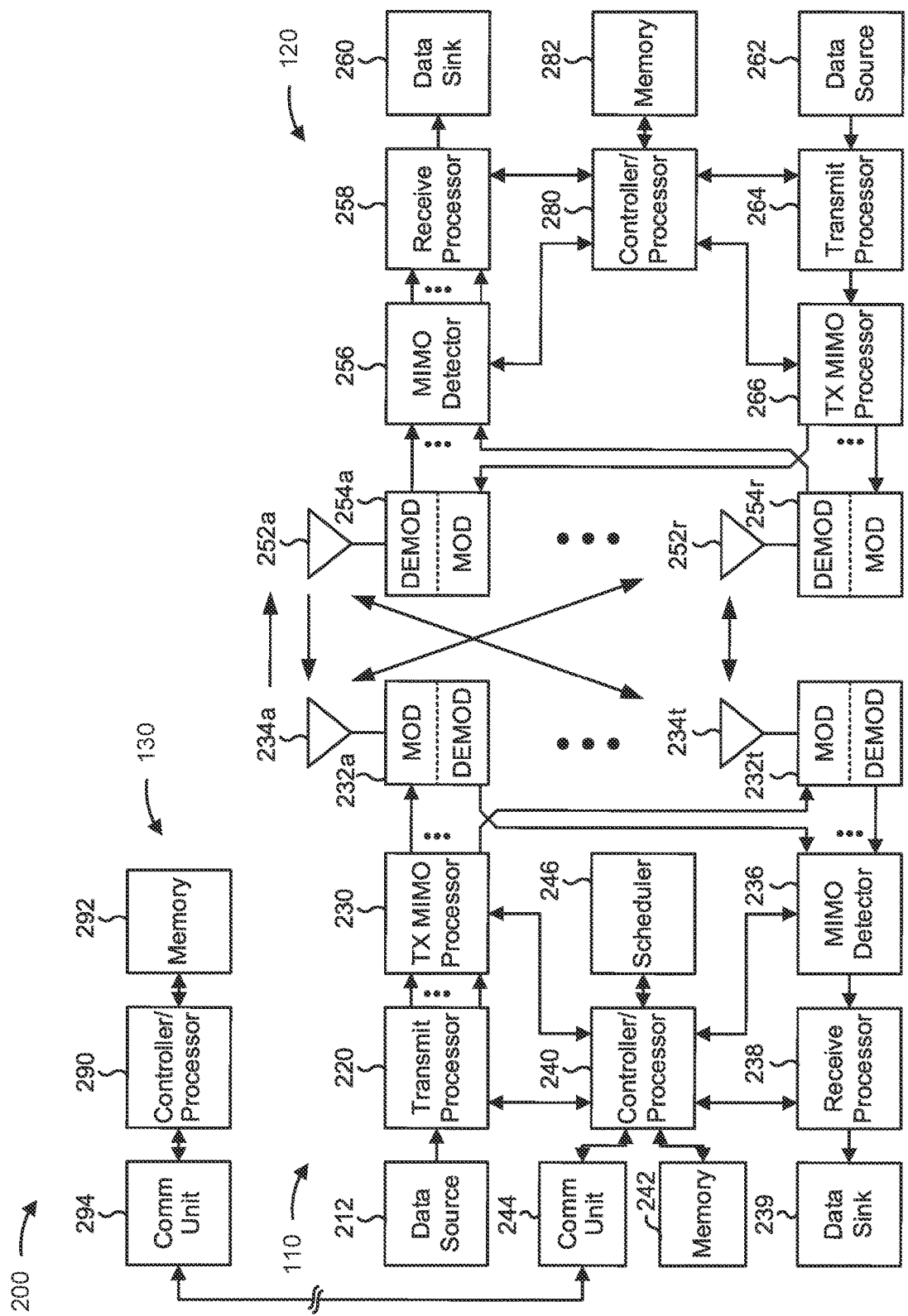
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision avoidance in a multi-subscriber identity module (MSIM) UE, as described in more detail elsewhere herein. For example, controller/processor 240 of base station 110, controller/processor 280 of UE 120, and/or any other component(s) of FIG. 2 may perform or direct operations of, for example, scheme 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, the method 500 of FIG. 5 and/or other processes as described herein. A scheduler 246 may schedule UEs for data transmission on the downlink and/or uplink.

In some aspects, UE 120 may include means for detecting a radio access technology (RAT) of a first cell on which a first subscription of the UE is configured to camp is same as the RAT of a secondary cell group (SCG) on which a second subscription of the UE that is in a dual connectivity mode is configured to camp; and means for triggering, in response to the detecting, the first subscription or the second subscription to perform a mode operation of the second subscription or the first subscription, respectively. In some aspects, the UE 120 may be camped using one or more subscriptions, on one or more cells based on a cell selection or reselection process. For example, the UE 120 may be considered "camped" on a cell if the UE 120 has performed a cell selection or reselection process and has identified a suitable cell for camping, and has registered on the cell. The UE 120 may be in various communication states with a network device, such as a BS. For example, the UE 120 may be in a connected state, an idle state, an inactive state, and/or any suitable state. The communication state may be a radio resource control (RRC) state. For example, the UE 120 may be in RRC_CONNECTED, RRC_IDLE, or RRC_INACTIVE. In some aspects, in RRC_CONNECTED, the UE 120 may have the RRC context, which may be the parameters involved for communication between the UE 120 and the network, and the UE 120 has registered to a cell. In RRC_IDLE, the UE 120 may not have the parameters for communication between the UE 120 and the network. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
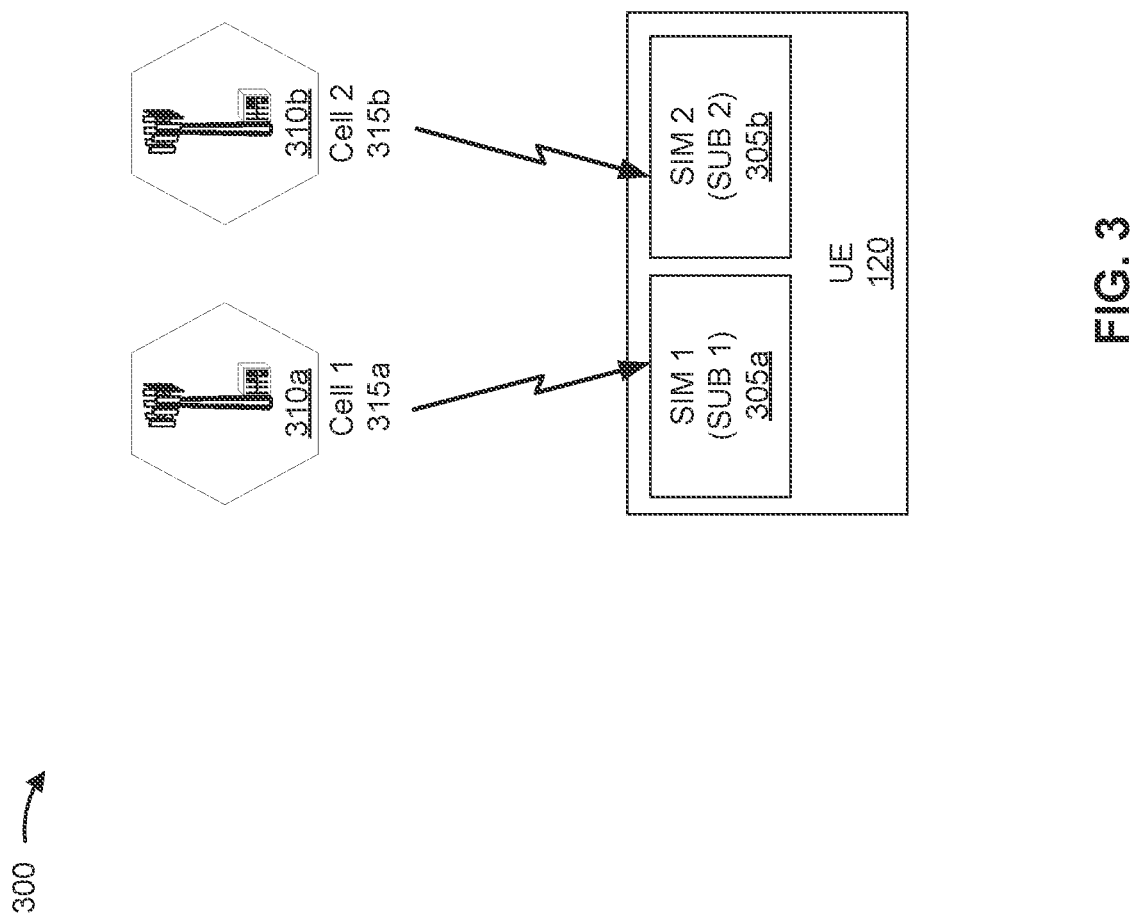
FIG. 3 is a diagram illustrating an example of operations of a multi-subscriber identity module user equipment, in accordance with various aspects of the present disclosure.

FIG. 3 is a diagram illustrating an example 300 of operations of a multi-subscriber identity module (multi-SIM) UE, in accordance with various aspects of the present disclosure. As shown in FIG. 3, a UE 120 may be a multi-SIM UE that includes multiple SIMs (e.g., two or more SIMs), shown as a first SIM 305a (shown as SIM 1) and a second SIM 305b (shown as SIM 2). The first SIM 305a may be associated with a first subscription (shown as SUB 1), and the second SIM 305b may be associated with a second subscription (shown as SUB 2). "Subscription" may refer to a subscription with a network operator (e.g., a mobile network operator (MNO)) that permits the UE 120 to access a wireless network (e.g., a radio access network (RAN)) associated with the network operator. A SIM 305 may be a removable SIM (e.g., a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, and/or the like.

As further shown in FIG. 3, the UE 120 may communicate (e.g., in a connected mode or an idle mode) with a first base station 310a via a first cell 315a (shown as Cell 1) using the first SIM 305a. In this case, a first subscription (SUB 1) of the UE 120 may be used to access the first cell 315a (e.g., using a first IMSI for UE identification, using a first security key for UE authentication, using a first list of services that the UE 120 is permitted to access using the first subscription, by counting data and/or voice usage on the first cell against the first subscription, and/or the like). Similarly, the UE 120 may communicate (e.g., in a connected mode or an idle mode) with a second base station 310b via a second cell 315b (shown as Cell 2) using the second SIM 305b. In this case, a second subscription (SUB 2) of the UE 120 may be used to access the second cell 315b (e.g., using a second IMSI for UE identification, using a second security key for UE authentication, using a second list of services that the UE 120 is permitted to access using the second subscription, by counting data and/or voice usage on the second cell against the second subscription, and/or the like). The first base station 310a and/or the second base station 310b may include one or more of the base stations 110 described above in connection with FIG. 1.

In some aspects, the UE 120 may be a dual SIM dual standby (DSDS) UE, where SIM 1 305a and SIM 2 305b may share a single transceiver. In such cases, SIM 1 305a and SIM 2 305b can both be used in idle mode (time multiplexing can be used to maintain both SIMs in idle mode). However, only one of the two SIMs can be used in an active mode; i.e., the radio connection to one of the SIMS may be disabled when the other SIM is connected in an active mode. For example, when one of SIM 1 305a and SIM 2 305b is in an active state, i.e., when the radio connection between the UE 120 and the network (e.g., LTE network, NR network, etc.) is active, the radio connection for the other SIM may become disabled because only one of SIM 1 305a and SIM 2 305b can be used in the active mode when the UE 120 is a DSDS UE.

In some aspects, one of the subscriptions of the MSIM UE 120 may be a dedicated data subscription (DDS) subscription that is configured for receiving data services from the network on which that subscription is camped while the other subscription may be a non-DDS (n-DDS) subscription. In some instances, the DDS subscription may be camped on a LTE network or NR network. Further, in some instances, the n-DDS subscription may be camped on a NR network. In some instances, the MSIM UE 120 may be a DSDS UE, and one of the subscriptions may be a DDS subscription in an active mode and the other subscription may be a n-DDS subscription in an idle mode. For example, with reference to FIG. 3, SUB 1 that is associated with SIM 1 305a may be a DDS subscription in an active mode camped on a LTE network or NR network and SUB 2 that is associated with SIM 2 305*b* may be a non-DDS subscription in an idle mode camped on a NR network.

In some aspects, the data services that are received by the DDS subscription (e.g., SUB 1) from the network (e.g., LTE network, NR network, etc.) on which the DDS subscription is camped may include evolved multimedia broadcast multicast services (eMBMS) data services. That is, the data services may be a point-to-multipoint data services which may include, for example, downlink data transmissions such as but not limited to live streaming data, mobile TV data, radio broadcasting data, emergency alert data, etc., from a LTE BS or a NR BS to multiple UEs (e.g., including the UE 120). For example, SUB 1 of the MSIM UE 120 may be a DDS subscription. The DDS subscription may be configured to receive eMBMS data from a LTE/NR BS. In such instances, SUB 1 (e.g., the DDS subscription) may access the eMBMS data at some durations in time domain of the radio connection (i.e., time durations of the radio resources of the connection) between SUB 1 of the MSIM UE 120 and the base station transmitting the eMBMS data. In some cases, the durations in the time domain via which the eMBMS data are transmitted may be fixed time slots of the radio resources/connection, which may save radio resources.

Figure 4:
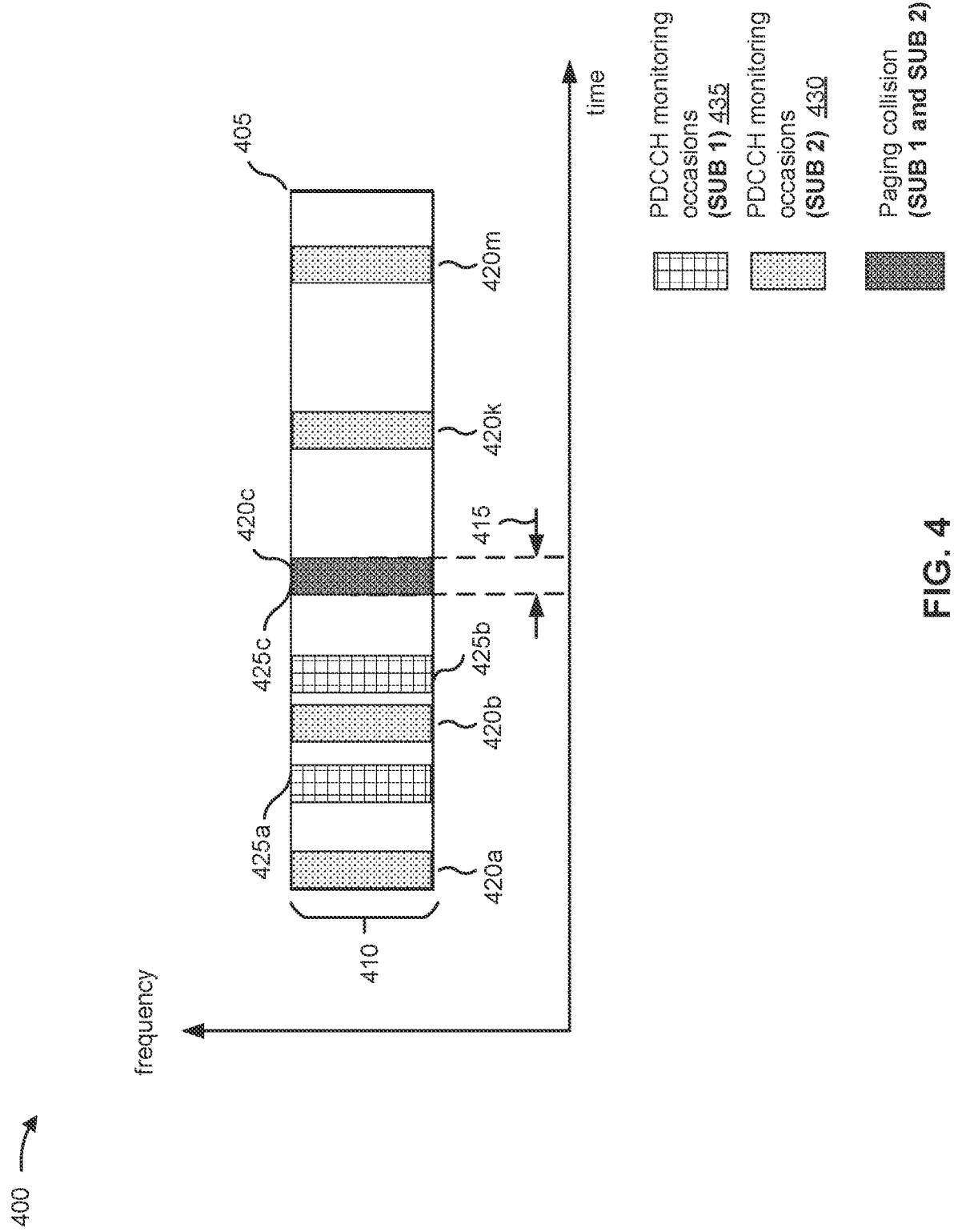
FIG. 4 is a diagram illustrating a multi-subscriber identity module paging scheme, in accordance with various aspects of the present disclosure.

FIG. 4 shows an example diagram illustrating a MSIM paging scheme 400 that includes a potential paging collision in accordance with various aspects of the present disclosure. In some instances, the scheme 400 may be employed by UEs such as the UEs 120 in a network such as the network 100, UE 120 in design 200, or UE 120 in example 300. The scheme 400 may also be employed by BSs such as the BSs 110 in the network 100, the BS 110 in design 200, or one or more of the BSs 310*a*, 310*b* in example 300. In some instances, the UE may have a first subscription SUB 1. The first subscription SUB 1 may be a DDS subscription. The UE may be configured to utilize the first subscription SUB 1 in a connected mode. The UE may be configured to communicate via a radio resource 405 (e.g., a bandwidth part (BWP)) of one or more frequency bands 410 when operating in the connected mode of the first subscription SUB 1. Further, the UE 120 may also have a second subscription SUB 2. The second subscription SUB 2 may be a n-DDS subscription. The UE may be configured to receive paging messages on the second subscription SUB 2 via PDCCH monitoring occasions 420*a*-420*m* in the one or more frequency bands 410. In FIG. 4, the x-axis represents time in some arbitrary units, and the y-axis represents frequency in some arbitrary units. In some instances, the frequency band 410 may be a subband of another larger frequency band that is partitioned into multiple subbands (e.g., one of which is frequency subband 410). For example, the frequency subband 410 may be one of four frequency subbands. Each subband may have a bandwidth (BW) of about 20 MHz. Each subband may be partitioned from a frequency band that has a BW of about 80 MHz. In some cases, the frequency band or subband 410 (hereinafter referred as "subband") may be at any suitable frequencies (e.g., at about 2.4 GHz, 5 GHz, 6 GHz or higher) and may have any suitable bandwidth (e.g., about 80 MHz, 100 MHz, or higher). The frequency subband 410 may be shared by multiple network operating entities of same radio access technologies (RATs) or different RATs.

In some aspects, the first subscription of the UE (e.g., DDS subscription SUB 1) may establish a first connection with an LTE or NR BS (e.g., BS 110) and communicate with the BS over the established first connection. Similarly, the second subscription (e.g., n-DDS subscription SUB 2) may establish a second connection with a NR BS (e.g., BS 110) and communicate with the NR BS over the established second connection. In some aspects, as discussed above, if the MSIM UE is a DSDS UE with a DDS SUB 1 and a n-DDS SUB 2, and if SUB 1 is in an active mode, then the other subscription SUB 2 may be in an idle mode. As such, for example, DDS SUB 1 may establish a first connection and communicate in an active mode with a LTE or NR BS to receive, for example, data in a time domain of the radio resource 405. In such cases, the n-DDS SUB 2 may not be in active mode but rather may be in an idle mode, and may wake up during paging occasions to monitor for paging messages from the NR BS on which n-DDS SUB 2 is camped.

In some cases, the NR BS may configure the UE with a DRX cycle and/or a paging cycle for SUB 2. In some instances, each DRX cycle may include one or more paging occasions. Further, the NR BS may configure the UE with a set of one or more PDCCH monitoring occasions for each paging occasion on SUB 2 and/or SUB 1. If the NR BS has data to transmit to the UE over the SUB 2 while the UE is in an idle mode on SUB 2, the NR BS may send a paging message to the UE on the SUB 2 during a paging occasion of SUB 2. In some instances, if the UE detects a paging message on SUB 2 from the NR BS on which SUB 2 is camped, the UE may decode the content of the paging message and initiate any applicable procedures for processing the content. To page SUB 2, the NR BS may send a PDCCH with a paging signature during a PDCCH monitoring occasion within a paging occasion. The paging signature may be a predetermined sequence and the PDCCH may be scrambled with the predetermined sequence. In context of NR, the paging signature may be referred to as a paging-radio network temporary identifier (P-RNTI). The paging PDCCH may indicate that the scheduling grant in the PDCCH is for paging.

In the scheme 400, the NR BS on which n-DDS SUB 2 is camped may configure the UE with one or more paging occasions 430 for n-DDS SUB 2 in the radio resource 405, where each paging occasion 430 may include a set of consecutive PDCCH monitoring occasions 420. Further, the BS on which the DDS SUB 1 is camped may configure the UE with one or more paging occasions 435 for DDS SUB 1 in the radio resource 405, where each paging occasion 435 may include a set of consecutive PDCCH monitoring occasions 425. It is to be noted that FIG. 4 is a non-limiting example illustration and that a radio resource 405 may be configured with any number of paging occasions that may include any number of PDCCH monitoring occasions.

In some aspects, each PDCCH monitoring occasion 420, 425 may be associated with a synchronization signal block (SSB) (e.g., including PSS, SSS, and/or PBCH signals) transmitted by the NR BS on which the n-DDS SUB 2 is camped. In some aspects, a paging occasion 430, 435 may include S×X consecutive PDCCH monitoring occasions 420, 425, where S represents the number of SSBs transmitted by the NR BS and X represents the number of PDCCH monitoring occasions associated with each SSB. In the context of NR, the NR BS may transmit a system information block Type 1 (SIB1) including a ssb-PositionInBurst parameter field indicating a value for the S parameter. The BS may also configure the UE with a numPDCCHMonitoringOccasionPerSSB parameter field for SUB 1 and/or SUB 2 indicating a value for the X parameter. If the X parameter is not configured for SUB 2, the UE may set the parameter X to a value of 1.

In some instances, a paging occasion and the set of PDCCH monitoring occasions included therein may be associated with an SSB transmitted by the NR BS on which the n-DDS SUB 2 and/or the DDS SUB 1 is camped. In some aspects, in a multi-beam operation, the NR BS may transmit multiple beams (e.g., in multiple directions) each carrying an SSB and the SSBs may each be associated with a paging occasion and its related PDCCH monitoring occasions. For example, the PDCCH monitoring occasions 420a, 420b, 420c thereof may be associated with a SSB of index 0, referred to as SSB 0. The SSB 0 may be transmitted by the NR BS to the n-UE on SUB 2 via a first beam. The PDCCH monitoring occasions 420k, 420m, may be associated with SSB of index 1, referred to as SSB 1. The SSB 1 may be transmitted by the NR BS to the UE on the n-DDS SUB 2 via a second beam.

In some aspects, the NR BS may determine to page the n-DDS SUB 2 while the n-DDS SUB 2 is in an idle mode. The NR BS may determine to page SUB 2 upon detecting data for the n-DDS SUB 2 when the DDS SUB 1 is in an active mode or connected mode with a LTE BS or NR BS. The NR BS on which the n-DDS SUB 2 is camped may page the n-DDS SUB 2 by sending a paging message to UE in the paging occasion 430. For example, the NR BS may send a PDCCH (e.g., with a P-RNTI) during one or more the PDCCH monitoring occasions 420 of the paging occasion 430 to indicate a paging message transmission schedule. In some instances, the paging messages from the NR BS to the UE on n-DDS SUB 2 may be transmitted via the multiple beams (e.g., and associated SSBs). That is, in some cases, the paging message from the NR BS may be transmitted across multiple or all the SSBs from the NR BS.

In some instances, UEs may select beams (and associated SSBs) for page/data decoding (e.g., by the subscriptions thereof) based on signal strength of the beams. The UEs may measure signal strength using signal strength indicators. Signal strength indicators may include, for example, a reference signal received power (RSRP), a signal to interference plus noise ratio (SINR), a received signal strength indicator (RSSI), a reference signal received quality (RSRQ), a signal to noise plus interference ratio (SNIR), a signal to noise ratio (SNR), and/or the like. For example, the MSIM UE may select SSB 1 associated with the PDCCH monitoring occasions 420a, 420b, 420c based on one or more of the afore-mentioned signal strength indicators for the decoding of n-DDS SUB 2 paging messages by the MSIM UE.

In some aspects, the UE may determine to enter an idle mode or idle state for the DDS SUB 1. In the idle mode, the UE may monitor for paging messages on one or more paging occasions 435 associated with the DDS SUB 1. The one or more paging occasions 435 may include one or more PDCCH monitoring occasions 425a-425c. In some instances, the pages or paging messages of the n-DDS SUB 2 may be lost if one or more DDS SUB 1 paging messages are received at the UE in a time period 415 that at least partially overlaps with one of the PDCCH monitoring occasions 420 in which the n-DDS SUB 2 paging messages are configured to be received at the MSIM UE. In some instances, the UE may detect a potential collision in the duration 415 that is configured for monitoring a DDS SUB 1 PDCCH monitoring occasion 425c associated with a DDS SUB 1 paging occasion and the PDCCH monitoring occasion 420c associated with the n-DDS SUB 2 paging occasion 430. In some instances, the potential collision between the DDS SUB 1 and n-DDS SUB 2 pages or paging messages may cause the loss of the paging messages.

The present disclosure describes mechanisms for proactively detecting and avoiding potential paging collisions based on the paging configurations associated with each subscription of an MSIM UE. For example, the UE, while in connected mode on a DDS, may receive system information (e.g., SIB) indicating a paging configuration or a parameter for monitoring paging occasions on the DDS. The UE may decode the system information to determine the paging occasions and/or PDCCH monitoring occasions. The UE may determine, based on the paging configuration, whether one or more DDS paging occasions may potentially collide with one or more n-DDS paging occasions. If a potential paging collision is detected, the UE may initiate a registration update by transmitting a registration update request to the BS. The BS may respond by transmitting a registration update to the UE. The registration update may include or indicate a temporary identifier. For example, transmitting the registration update may include transmitting an updated 5G global unique temporary identifier (GUTI). The UE may then update the paging configuration for the DDS sub before the potential collision occurs. While still in the connected mode and upon detecting the potential paging collision and between the DDS SUB 1 PDCCH monitoring occasion 425c and the n-DDS SUB 2 PDCCH monitoring occasion 420c, the MSIM UE may monitor for paging messages using the updated paging configuration for monitoring that is different from the paging configuration associated with the potential paging collision.

The paging occasions may be determined using the index (i,s). The index may indicate the start of a set of PDCCH monitoring occasions for the paging DCI. In some instances, the start of the set of PDCCH monitoring occasions may be determined using the formula i_s=floor (UE_ID/N) mod Ns, where default association Ns is either 1 or 2. Since i_s depends on UE_ID that may be a function of 5G-S-TMSI (i.e., UE_ID=5G-S-TMSI mod 1024), which in turn may be a function of 5G-GUTI, an update to 5G-GUTI may result in an update or change to the index (i,s). Accordingly, an update or change to 5G-GUTI may result in a corresponding update or change to the start of a set of PDCCH monitoring occasions.

5G-GUTI may be updated (i.e., a MSIM UE may be assigned a new 5G-GUTI) when the UE undergoes a mobility registration update. Upon receiving registration request message of type "initial registration" or "mobility registration update" from a UE, the access and mobility management function (AMF) of the NR network may send a new 5G-GUTI to the UE in the registration procedure. In some instances, the generated 5G-GUTI may contain a 5G-TMSI that uniquely identifies the UE within the AMF. A new I-RNTI may be sent to a UE only after a successful activation of access stratum (AS) security. As such, upon detecting a collision between a paging occasion of the n-DDS and a paging occasion of the DDS, the MSIM UE may avoid or overcome the collision by triggering the NR network on which the n-DDS SUB 2 of the MSIM UE is camped to initiate a mobility registration update of the MSIM UE. The mobility registration update may result in a reassignment or update of 5G-GUTI. The reassignment of the 5G-GUTI may, in turn, result in the reassignment or update of 5G-S-TMSI. Accordingly, the UE may update the index (i,s) based on the updated 5G-S-TMSI, the index indicating an updated paging occasion that is configured to avoid the collision.

Figure 5:
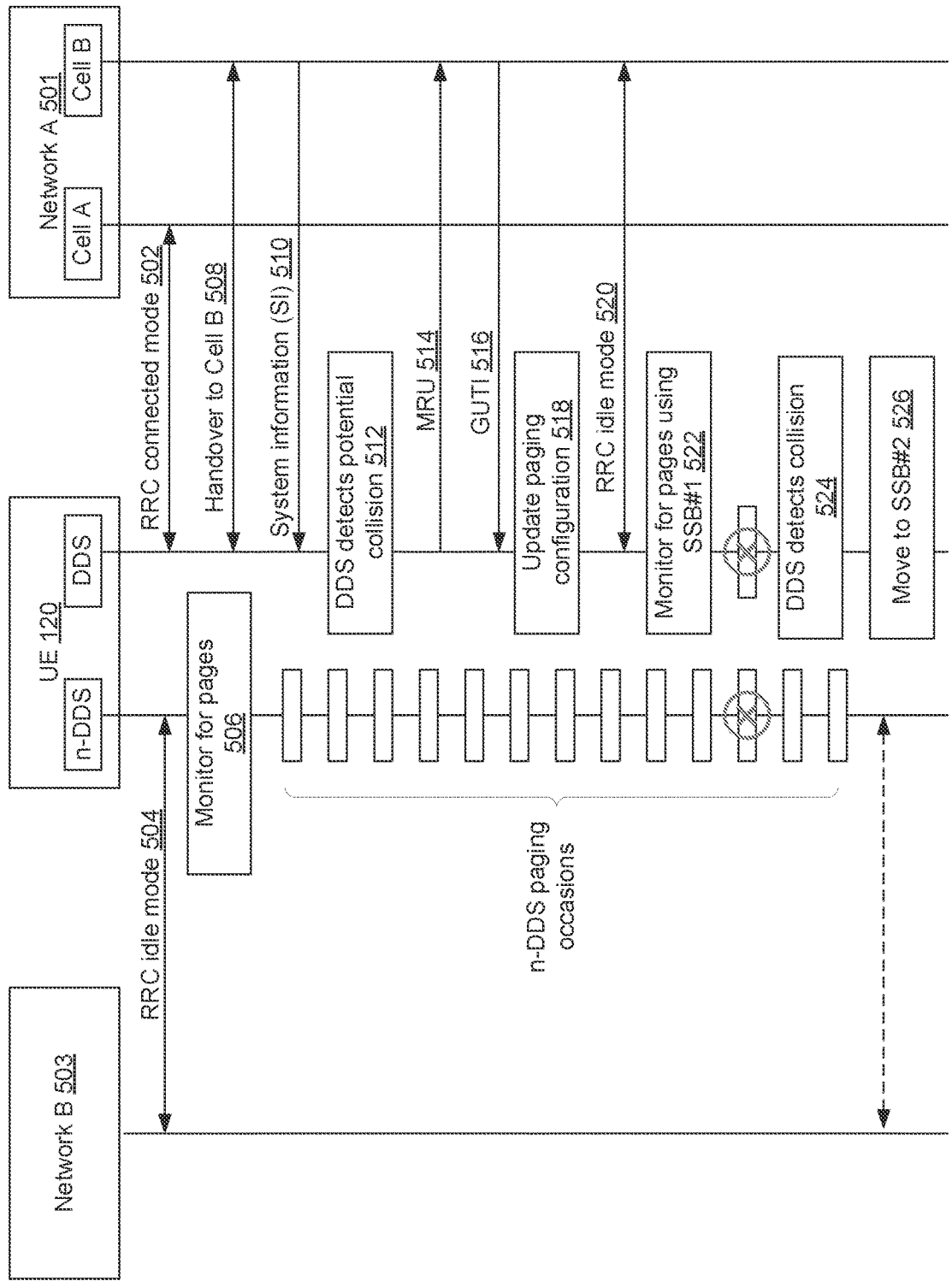
FIG. 5 is a signaling diagram of a scheme for paging collision avoidance, in accordance with various aspects of the present disclosure.

FIG. 5 is a signaling diagram of a scheme 500 for paging collision avoidance according to some aspects of the present disclosure. In some instances, the scheme 500 is employed by a UE 120, a first network (Network A) 501, and a second network (Network B) 503. The UE 120 may be a MSIM UE, for example. In some aspects, the networks 501, 503 may include BSs, and/or other wireless communication devices. The network 501 is configured to communicate using a first cell (Cell A) and a second cell (Cell B). For example, the UE 120 may be configured to camp on Cell A or on Cell B. Aspects of the scheme 500 may be performed by the UEs 120 and BSs 110 in the network 100, UE 120 in design 200, BS 110 is design 200, a UE 120 in example 300, and/or a BS 310 in the example 300. In some instances, the UE 120 in FIG. 5 may operate using a DDS and a n-DDS. The UE may be configured with the DDS in a connected mode, and the n-DDS in an idle mode. The UE may be configured to communicate via a radio resource (e.g., band width part (BWP)), which may comprise a frequency band. Further, the UE 120 may also operate using a n-DDS. The UE may be configured to receive paging messages via one or more paging occasions.

Referring to FIG. 5, in action 502, the UE 120 communicates with Cell A of the Network A 501 with the DDS in a connected mode or. For example, the UE 120 may monitor for downlink control information (DCI) in a plurality of PDCCH occasions by attempting to decode the PDCCH occasions. Upon a successful detection of DCI, the UE 120 may identify scheduled DL/UL data for communication during a PDSCH and/or a PUSCH. Further, in action 504, the UE 120 communicates with the Network B 503 with the n-DDS in an RRC idle mode. In the idle mode, the UE 120 monitors for n-DDS paging messages with a DRX cycle or a paging cycle in action 506. Each DRX cycle may include one paging occasion. Further, the Network B 503 may configure the n-DDS with a set of PDCCH monitoring occasions for each paging occasion. If the Network B 503 receives data for the n-DDS while n-DDS is in the idle mode, the Network 503 may send a n-DDS paging message to the UE 120 during a n-DDS paging occasion. In some instances, if the UE 120 detects a n-DDS paging message from the Network 503 on which the n-DDS is camped, the UE 120 may decode the content of the paging message and initiate any applicable procedures for processing the content.

At action 508, the UE 120 determines to perform a handover procedure of the DDS from Cell A to Cell B of the network 501. The UE 120 may determine to switch the DDS to Cell A based on signal measurements, network traffic, and/or other factors. Action 508 may include an RRC registration request procedure. For example, the UE 120 may transmit, to the Network A 501 on the DDS, a registration update request associated with Cell B. The Network 501 may receive the request, and transmit a registration update to the UE 120, and the UE may camp the DDS on Cell B. Based on the handover procedure of action 508, the Network 501 transmits, and the UE 120 receives, system information associated with Cell B. The system information may include a system information block (SIB) message, such as SIB 1, SIB and/or any other suitable system information. In some aspects, action 510 includes the UE 120 receiving a new identifier, such as a global unique temporary identifier (GUTI). The GUTI may include or indicate a temporary mobile subscriber identity (TMSI).

In some instances, the UE 120 may determine to change the DDS to an idle mode on Cell B of the network 501. The UE 120 may determine a DDS paging configuration based on the system information communicated in action 510. For example, the UE 120 may determine the time domain resources associated with DDS paging occasions. The UE 120 may monitor for DDS paging messages from the Network 501 based on the time domain resources. The DDS paging configuration may include or indicate timing-related parameters for the paging configuration, such as system frame number, paging frame, paging occasion index, and/or any other suitable parameter.

At action 512, the UE 120 detects, based on the first paging configuration of the n-DDS and the second paging configuration determined for the DDS, a potential paging collision. For example, the UE 120 may determine the timing of paging occasions for each of the n-DDS and the DDS, and determine whether one or more of the paging occasions conflict (e.g., overlap in time) with one or more of the paging occasions of the other subscription. Accordingly, the UE 120 may proactively determine the potential collision before it occurs, and before entering an idle mode or state (e.g., RRC_IDLE).

At action 514, the UE 120 transmits, to the Network 501 using the DDS, a mobility registration update (MRU) request based on the first paging configuration for the n-DDS and the second paging configuration for the DDS. At action 516, based on the MRU, the Network 501 transmits, and the UE 120 receives, system information including a GUTI. In some aspects, the GUTI may include or indicate a TMSI. Based on the TMSI, at action 518, the UE 120 updates the paging configuration for the DDS. For example, the UE 120 may update the paging configuration for the DDS in accordance with equations (1) and (2) below. In some aspects, the UE 120 may update the paging configuration before entering the idle mode.

At action 520, the UE 120 enters or initiates an idle mode (e.g., RRC_IDLE) for the DDS. In some aspects, action 520 includes the UE 120 informing the non-access stratum (NAS) regarding the change to the idle mode for the DDS.

At action 522, the UE 120 monitors for DDS paging messages based on the updated paging configuration determined at action 518. The UE 120 may monitor for the DDS paging messages in PDCCH monitoring occasions associated with a first SSB (SSB #1). As explained above the first SSB may be associated with a first beam direction. In some instances, the UE 120 may select one or more beams (and associated SSBs) for page/data decoding (e.g., by the subscriptions thereof) based on signal strength of the beams as measured using signal strength indicators such as but not limited to a reference signal received power (RSRP), a signal to interference plus noise ratio (SINR), a received signal strength indicator (RSSI), a reference signal received quality (RSRQ), a signal to noise plus interference ratio (SNIR), a signal to noise ratio (SNR), and/or the like. For example, the UE 120 may select SSB #1 associated with a first set of PDCCH monitoring occasions based on one or more of the afore-mentioned signal strength indicators for the decoding of DDS paging messages by the UE 120.

The UE 120 may monitor for paging messages with a DRX cycle or a paging cycle in action 522. Each DRX cycle may include one paging occasion. The Network 501 may configure the UE 120 with a set of PDCCH monitoring occasions for each DDS paging occasion. If the Network 501 has data to transmit to the UE 120 for the DDS, while the UE 120 is in the idle mode for the DDS, the Network 501 may send a paging message to the UE 120 during a DDS paging occasion.

At action 524, while the UE 120 is in the idle mode for the DDS, the UE 120 detects a paging collision between a paging occasion of the n-DDS and a paging occasion of the DDS, where the paging occasion of the DDS is based on the updated paging configuration determined in action 518.

Based on the detected paging collision, the UE 120 moves to SSB #2 in action 526. That is, the reception of the paging messages may be switched from the beam carrying SSB #1 transmitted via a first paging occasions to the beam carrying SSB #2 transmitted via a different paging occasion. The different paging occasion associated with SSB #2 may avoid further paging collisions between the DDS paging occasions and the n-DDS paging occasions. In FIG. 5, the UE 120 moves the DDS to SSB #2. However, in other aspects, the UE 120 may move the n-DDS to a different SSB. In some aspects, the UE 120 may switch to SSB #2 based on the signal strength indicators such as but not limited to RSRP, SINR, RSSI, RSRQ, SNIR, SNR, and/or the like, of the beam (e.g., associated with SSB 1) carrying the paging messages. For example, the switching may occur when one or more of the signal strength indicators is within respective threshold signal strength indicators. In some instances, the threshold signal strength indicators may represent at least adequate conditions for decoding the paging messages. In some aspects, the UE 120 may follow the measurement rules for cell re-selection discussed in 3GPP technical specification (TS) 38.304 Release 16, which is incorporated herein by reference in its entirety.

Figure 6:
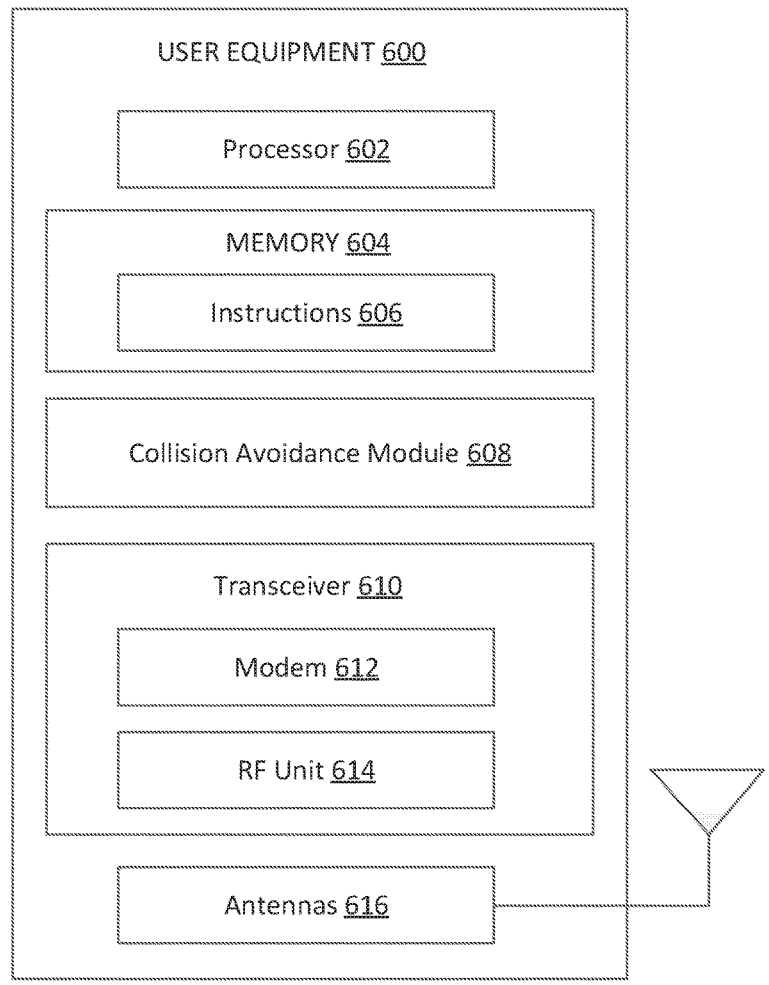
FIG. 6 is a block diagram of an exemplary user equipment according to some aspects of the present disclosure.

FIG. 6 is a block diagram of an exemplary UE 600 according to some aspects of the present disclosure. The UE 600 may be a UE 120 as discussed above with respect to FIGS. 1, 2, and 3. As shown, the UE 600 may include a processor 602, a memory 604, a Collision Avoidance Module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4, and 7. Instructions 606 may also be referred to as program code, which may be interpreted broadly to include any type of computer-readable statement(s). The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Collision Avoidance Module 608 may be implemented via hardware, software, or combinations thereof. For example, the Collision Avoidance Module 608 may be implemented as a processor, circuit, and/or instructions 606 stored in the memory 604 and executed by the processor 602. In some examples, the Collision Avoidance Module 608 can be integrated within the modem subsystem 612. For example, the Collision Avoidance Module 608 can be implemented by a combination of software components (e.g., executed by a DSP or a general processor) and hardware components (e.g., logic gates and circuitry) within the modem subsystem 612.

The Collision Avoidance Module 608 may communicate with various components of the UE 600 to perform aspects of the present disclosure, for example, aspects of FIGS. 1-5 and 8. In some aspects, the Collision Avoidance Module 608 is configured to monitor, on a non-dedicated data subscription (n-DDS) of the UE 600, for one or more first paging messages based on a first paging configuration. In some aspects, the Collision Avoidance Module 608 is further configured to receive, from a base station (BS) on a dedicated data subscription (DDS) of the UE 600, system information indicating a second paging configuration. In some aspects, the Collision Avoidance Module 608 is further configured to transmit to the BS on the DDS, a registration update request based on the first paging configuration and the second paging configuration. In some aspects, the Collision Avoidance Module 608 is further configured to receive, from the BS based on the registration update request, a registration update. In some aspects, the Collision Avoidance Module 608 is further configured to monitor, on the DDS of the UE, for one or more second paging messages based on a third paging configuration different from the second paging configuration, wherein the third paging configuration is based on the registration update.

As shown, the transceiver 610 may include the modem subsystem 612 and the RF unit 614. The transceiver 610 can be configured to communicate bi-directionally with other devices, such as the BSs 110. The modem subsystem 612 may be configured to modulate and/or encode the data from the memory 604 and/or the Collision Avoidance Module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., control information (uplink and/or downlink), data (uplink and/or downlink), paging messages, etc.) from the modem subsystem 612 (on outbound transmissions) or of transmissions originating from another source such as a UE 120 or a BS 110. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 120 to enable the UE 120 to communicate with other devices.

The RF unit 614 may provide the modulated and/or processed data, e.g., data packets (or, more generally, data messages that may include one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., control information (uplink and/or downlink), data (uplink and/or downlink), paging messages, etc.) to the Collision Avoidance Module 608 for processing. The antennas 616 may include multiple antennas of similar or different designs in order to sustain multiple transmission links. The RF unit 614 may configure the antennas 616.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
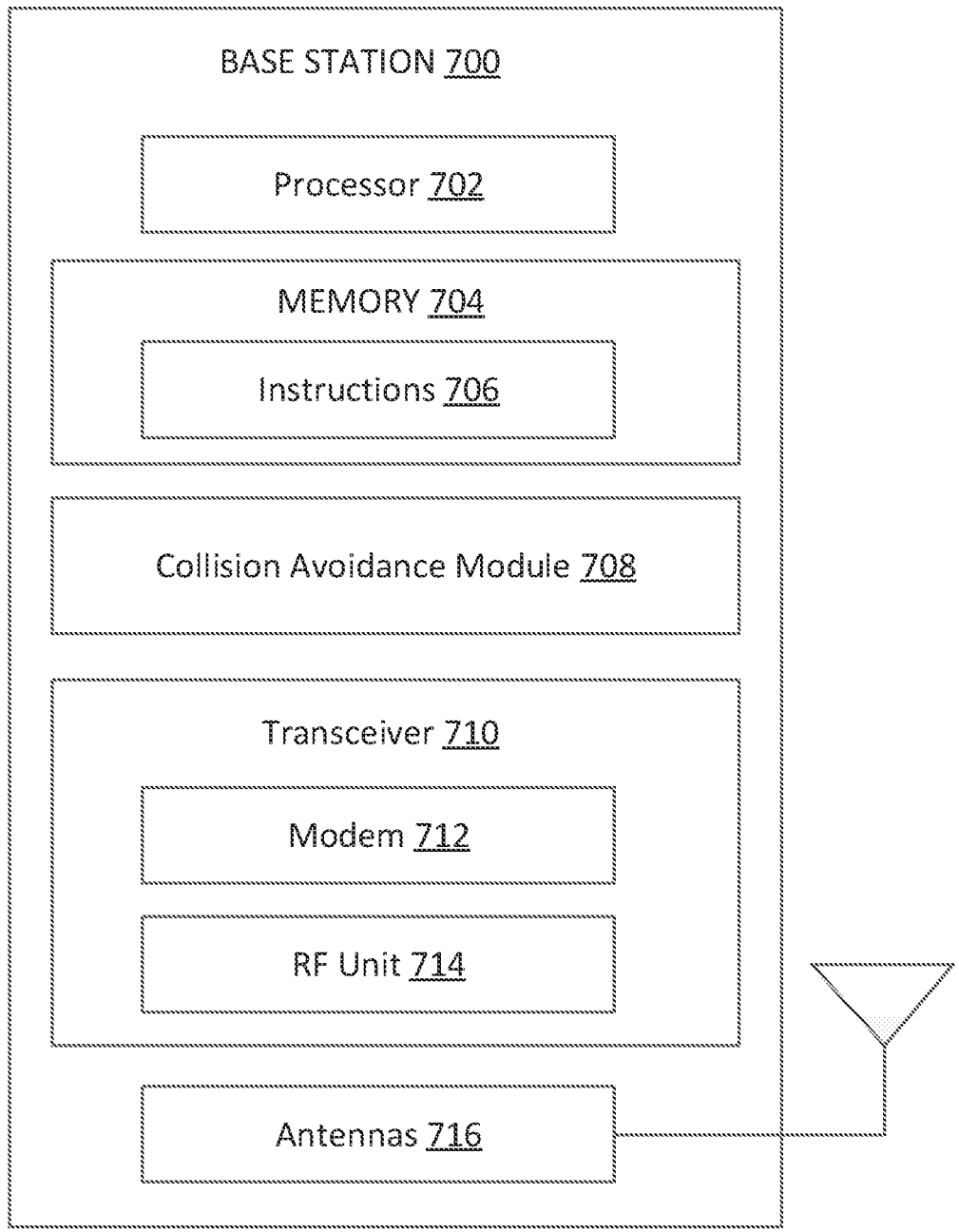
FIG. 7 is a block diagram of an exemplary base station according to some aspects of the present disclosure.

FIG. 7 is a block diagram of an exemplary BS 700 according to some aspects of the present disclosure. The BS 700 may be a BS 110 in the network 100 as discussed above in FIG. 1, or 2, or a BS 310 as discussed above in FIG. 3. A shown, the BS 700 may include a processor 702, a memory 704, a Collision Avoidance Module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein, for example, aspects of aspects of FIGS. 1-4, and 7. Instructions 706 may also be referred to as program code, which may be interpreted broadly to include any type of computer-readable statement(s).

The Collision Avoidance Module 708 may be implemented via hardware, software, or combinations thereof. For example, the Collision Avoidance Module 708 may be implemented as a processor, circuit, and/or instructions 706 stored in the memory 704 and executed by the processor 702. In some examples, the Collision Avoidance Module 708 can be integrated within the modem subsystem 712. For example, the Collision Avoidance Module 708 can be implemented by a combination of software components (e.g., executed by a DSP or a general processor) and hardware components (e.g., logic gates and circuitry) within the In some aspects, the Collision Avoidance Module 708 is configured to transmit, to a user equipment (UE) on a dedicated data subscription (DDS), system information indicating a first DDS paging configuration. In some aspects, the Collision Avoidance Module 708 is further configured to receive from the UE on the DDS, a registration update request based on the first DDS paging configuration and a n-DDS paging configuration. In some aspects, the Collision Avoidance Module 708 is further configured to transmit, to the UE based on the registration update request, a registration update. In some aspects, the Collision Avoidance Module 708 is further configured to transmit, to the UE on the DDS, a paging message based on a second DDS paging configuration different from the first DDS paging configuration, wherein the second DDS paging configuration is based on the registration update.

As shown, the transceiver 710 may include the modem subsystem 712 and the RF unit 714. The transceiver 710 can be configured to communicate bi-directionally with other devices, such as the UEs 120 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC configuration, sidelink resource pools configurations) from the modem subsystem 712 (on outbound transmissions) or of transmissions originating from another source such as a UE 120. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 110 to enable the BS 110 to communicate with other devices.

The RF unit 714 may provide the modulated and/or processed data, e.g., data packets (or, more generally, data messages that may contain one or more data packets and other information), to the antennas 716 for transmission to one or more other devices. This may include, for example, transmission of downlink data and paging messages to a camped UE 120 according to some aspects of the present disclosure. The antennas 716 may further receive data messages transmitted from other devices and provide the received data messages for processing and/or demodulation at the transceiver 710. The transceiver 710 may provide the demodulated and decoded data to the MSS module 708 for processing. The antennas 716 may include multiple antennas of similar or different designs in order to sustain multiple transmission links.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
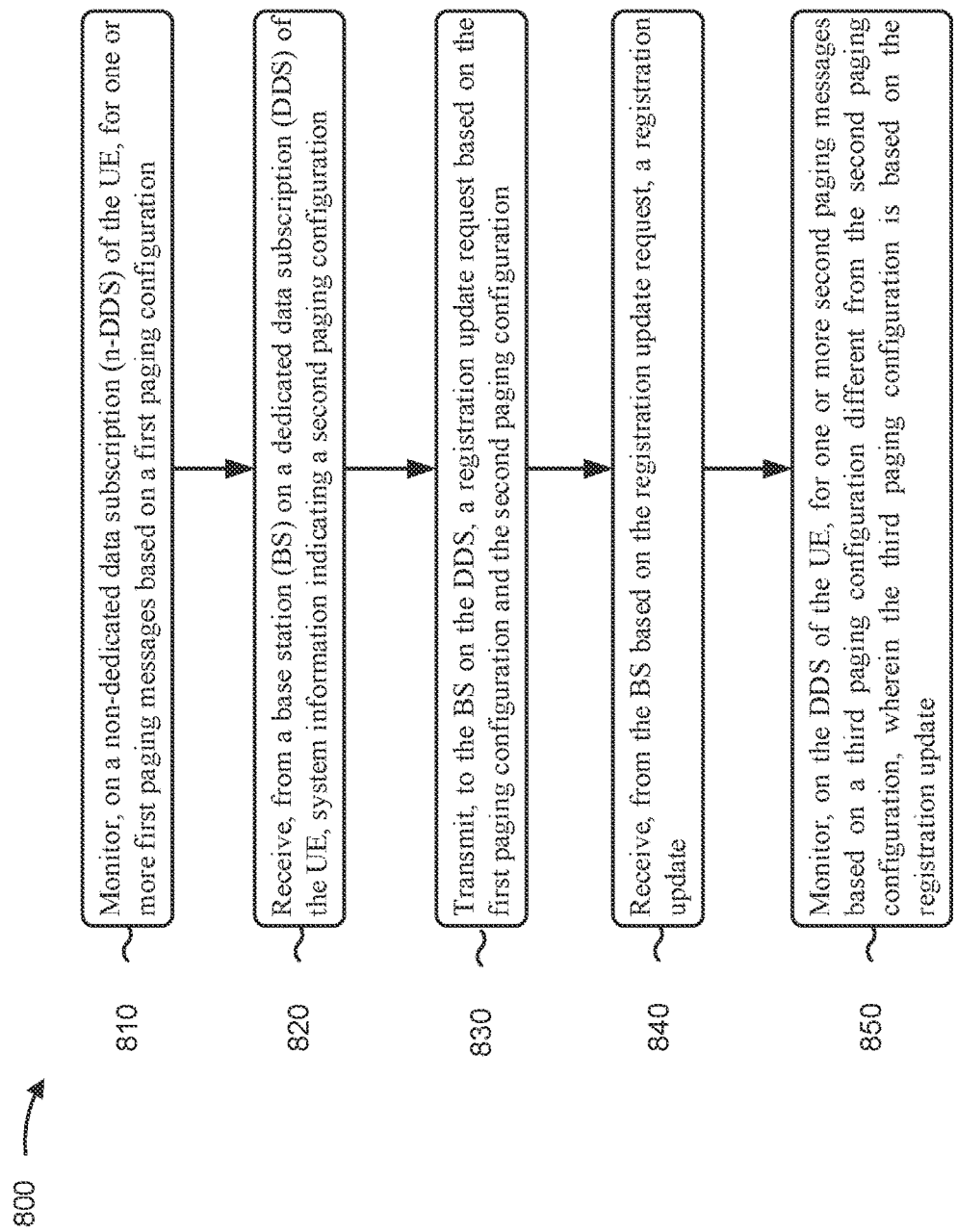
FIG. 8 is a diagram illustrating an example method performed by a user equipment, in accordance with various aspects of the present disclosure.

FIG. 8 is a flow diagram of a method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UE 600, may utilize one or more components, such as the processor 602, the memory 604, the Collision Avoidance Module 608, the transceiver 610, the modem 612, and the one or more antennas 616, to execute the steps of method 800. The method 800 may employ similar mechanisms as described above in FIGS. 1-5. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, in some aspects, a UE (e.g., the UE 600) monitors, on a non-dedicated data subscription (n-DDS) of the UE, for one or more first paging messages based on a first paging configuration. In some aspects, the UE may be a multi-subscriber identity module (MSIM) UE having a dedicated data subscription (DDS) and an n-DDS. In some aspects, the UE monitors, on the n-DDS, for the one or more first paging messages while in an idle mode or state. For example, the UE may monitor for the one or more first paging messages while the n-DDS is in a radio resource control (RRC) idle state (e.g., RRC_IDLE). The first paging configuration may include or indicate time resources (e.g., slots, symbols, frames, periodicity, slot format number, paging occasions, etc.) for monitoring for the one or more first paging messages. The UE may monitor for the one or more first paging messages by performing blind decoding in one or more candidate paging occasions indicated by the first paging configuration. In some aspects, the first paging configuration may be associated with a synchronization signal block (SSB), where the SSB is associated with a beam direction. For example, the UE may monitor for the one or more first paging messages from a BS of a first network, where the BS is configured to transmit a burst of SSBs in different beam directions. The UE may monitor for the one or more first paging messages in at least one of the beam directions associated with the SSB.

Monitoring for the one or more first paging messages may include periodically monitoring physical downlink control channel (PDCCH) occasions for the paging messages. In some aspects, monitoring for paging messages may include monitoring the PDCCH occasions for information encoded by P-RNTI, for example. The encoded information in the PDCCH may indicate the time/frequency resources of the paging message in a physical downlink shared channel (PDSCH). In some aspects, the paging configuration for monitoring for the paging messages is included or indicated in system information, such as a system information block (SIB). One or more parameters associated with the paging configuration may be indicated in SIB1, for example. The paging configuration may include or indicate timing-related parameters for the paging configuration, such as system frame number, paging frame, paging occasion, and/or any other suitable parameter. In some aspects, the paging frame (PF) is determined by the UE based on equation 1 below:

$$\text{PF=SFN mod } T = (T \text{ div } N)*(\text{UE\_ID mod } N) \quad (1)$$

Where the UE_ID is the 5G-S-TMSI mod 1024. In some aspects, the UE_ID may be a function of a global unique temporary identifier (GUTI). For example, the UE_ID may be determined based on the 5G-S-TMSI. The 5G-S-TMSI may be based on a 5G GUTI. Thus, the first paging configuration used by the UE to monitor for paging messages may be based on a first GUTI, for example. In a further aspect, the index (i_s) of the paging occasion may be determined based on equation 2 below:

$$i\_s = \text{floor}\left(\frac{\text{UE\_ID}}{N}\right) \text{mod } N_S \quad (2)$$

At block 820, the UE receives, from a network device on a DDS of the UE, system information indicating a second paging configuration. The network device may be configured such that the UE communicates with the network via the network device. A network device may be, in one example, a base station (BS). In some aspects, receiving the system information includes receiving and decoding a SIB message (e.g., SIB1) indicating parameters for monitoring for paging messages, as similarly explained above. The system information may indicate one or more serving cells, SSB configurations, and/or any other suitable parameter. In some aspects, block 820 includes receiving a temporary identifier, such as a GUTI and/or a TMSI. The UE may determine the timing parameters for page monitoring based on the temporary identifier (e.g., 5G-S-TMSI), as explained above.

In some aspects, the n-DDS may be in an idle mode with a first network, and the DDS may be in a connected mode with a second network. For example, the UE may be configured to receive n-DDS paging messages from a first BS of the first network, and the UE may be configured to receive DDS data and/or DDS paging messages from a second BS of a second network. In other aspects, the n-DDS and the DDS may be in the idle mode and connected mode, respectively, with a same network. For example, the UE may have established DDS and n-DDS communications with a same BS.

At block 830, the UE transmits, to the BS on the DDS, a registration update request based on the first paging configuration and the second paging configuration. In this regard, the UE may determine, detect, or predict, based on the first paging configuration and the second paging configuration, a first potential paging collision for page occasions of the n-DDS and the DDS. In an exemplary aspect, the actions of block 830 are performed by the UE while the UE is in the connected mode on the DDS. For example, the connected mode may be RRC_CONNECTED. The UE may determine, based on the first paging configuration and the second paging configuration, the timing of paging occasions for each of the n-DDS and the DDS, and determine whether one or more of the paging occasions conflict (e.g., overlap in time) with one or more of the paging occasions of the other subscription. Accordingly, the UE may proactively determine the potential collision before it occurs, and before entering an idle mode or state (e.g., RRC idle).

In some aspects, transmitting the registration update request includes transmitting a RRC message to the BS with which the UE is connected on the DDS. For example, block 830 may include transmitting a mobility registration update (MRU) to the BS. The registration update request may prompt the network to assign a new temporary identifier (e.g., GUTI) to the UE.

At block 840, the UE receives, from the BS based on the registration update request, a registration update. In some aspects, receiving the registration update includes receiving a new GUTI from the network with which the UE is connected on the DDS. In some aspects, the GUTI may include or indicate a TMSI. Based on the TMSI, the UE may determine or update the page monitoring configuration parameters in accordance with equations (1) and (2), for example. In another aspect, the UE may receive the registration update while still in the connected mode, before entering the idle mode.

At block 850, the UE monitors, on the DDS, for one or more second paging messages based on a third paging configuration different from the second paging configuration, where the third paging configuration is based on the registration update. In some aspects, the UE monitors for the one or more second paging messages after entering an idle mode. Accordingly, in some aspects, the method 800 further includes initiating an idle mode (e.g., RRC_IDLE) before monitoring for the one or more second paging messages. As explained above, the UE may determine the third paging configuration based on the registration update. For example, the UE may determine the third paging configuration based on a GUTI provided by the network at block 840. In some aspects, the UE may determine the third paging configuration based on a TMSI indicated in the GUTI, in accordance with equations (1) and (2), for example. As similarly explained above, monitoring for the one or more second paging messages may include periodically monitoring PDCCH occasions for the paging messages. In some aspects, monitoring for paging messages may include monitoring the PDCCH occasions for information encoded by P-RNTI, for example. The encoded information in the PDCCH may indicate the time/frequency resources of the paging message in a PDSCH.

In some aspects, the registration update request may not result in an updated paging configuration. For example, in some aspects, the registration update may include a GUTI indicating a same TMSI previously used to determine the page monitoring parameters. In other aspects, the updated paging configuration determined based on the updated GUTI/TMSI may otherwise result in the same collision, or in a different collision. Accordingly, the UE may enter the idle mode and begin monitoring for the one or more second paging messages before the potential paging collision is resolved or prevented. The present application also provides mechanisms that can be used together with any of the actions of block 810-850 described above to prevent further paging collisions when the UE enters idle mode.

In one aspect, the method 800 further includes detecting, based on the first paging configuration and the third paging configuration, a second potential paging configuration. The detecting the second potential paging configuration may be performed while the DDS is in idle mode, in some aspects. The method may further include transmitting, to the BS based on the second potential paging collision, a second registration update request. As explained above, transmitting the second registration update request may include transmitting an MRU. The BS may transmit, based on the MRU, a registration update (e.g., updated GUTI), to the UE. The UE may again update the paging configuration for the DDS.

In another aspect, the UE may be configured to switch SSBs if the collision persists after updating the paging configuration as explained above. For example, the UE may be configured to initiate a cell reselection procedure to select a different SSB/beam direction. In some aspects, each SSB may be associated with different time resources. Accordingly, by switching to a different SSB, the paging occasions for the DDS (or n-DDS) may change so that further collisions are avoided. In some aspects, the UE may switch the SSB for the DDS. In other aspects, the UE may switch the SSB for the n-DDS. Accordingly, the UE may continue to monitor for either the first paging messages or the second paging messages based on the switched SSB.

In some aspects of method 800, the monitoring includes switching reception of the paging message from a first beam carrying a first synchronization signal block (SSB) transmitted via the first paging occasion to a second beam carrying a second SSB transmitted via the second paging occasion and spaced apart in time from the duration in time domain. Further, the switching occurs when a signal strength indicator of the second beam is within a respective threshold signal strength indicator. In some instances, the signal strength indicator is one or more of a reference signal received power (RSRP), a signal to interference plus noise ratio (SINR), a received signal strength indicator (RSSI), a reference signal received quality (RSRQ), a signal to noise plus interference ratio (SNIR), or a signal to noise ratio (SNR).

In some aspects of method 800, the second SSB includes a paging search space configured with a non-zero search space identity. In some instances, a periodicity of the paging search space is a minimum time duration that allows the MSIM UE to overcome the collision. For example, the periodicity may be no less than about 6 ms, about 8 ms, about 10 ms, about 15 ms, about 20 ms, including values and subranges therebetween.

Some aspects of method 800 comprises triggering, in response to the detecting the collision, a new radio (NR) network on which the n-DDS subscription is camped to initiate a mobility registration update of the UE. In some instances, the mobility registration update of the UE is configured to assign the UE an updated 5G global unique temporary identifier (5G-GUTI) or an updated 5G S-temporary mobile subscriber identity (5G-S-TMSI).

In some aspects of method 800, the DDS subscription is camped on a long-term evolution (LTE) network or a NR network, and the n-DDS subscription is camped on the NR network in an idle mode. In some cases, the DDS subscription is camped on a NR network. In some aspects of method 800, the UE is a dual subscriber identity module (SIM) dual standby (DSDS) UE.

Figure 9:
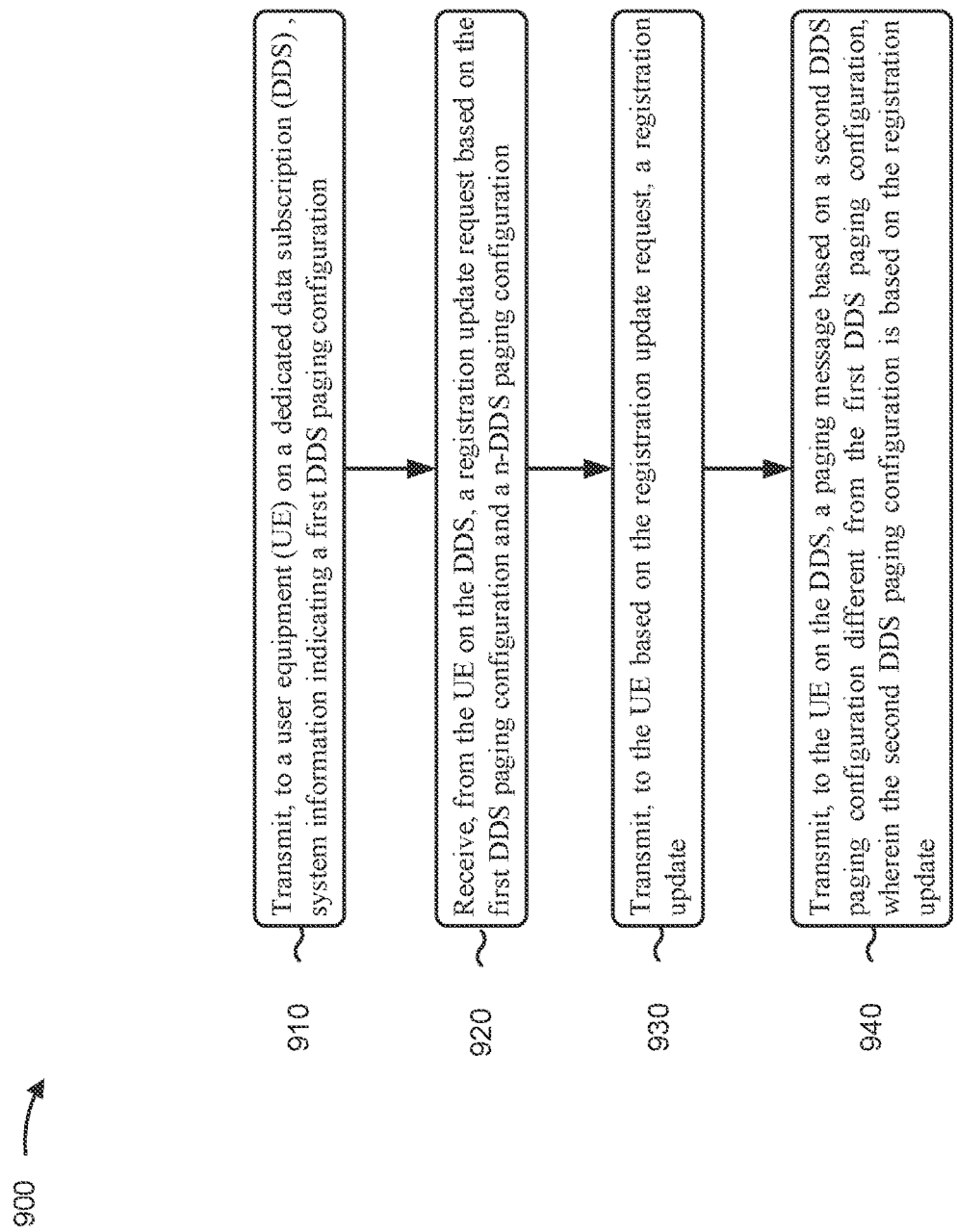
FIG. 9 is a diagram illustrating an example method performed by a base station, in accordance with various aspects of the present disclosure.

FIG. 9 is a flow diagram of a method 900 according to some aspects of the present disclosure. Aspects of the method 900 can be executed by a computing device (e.g., a processor, processing circuit, and/or other suitable component) of a network device or other suitable means for performing the steps. The network device may be configured such that a UE communicates with the network via the network device. A network device may be, in one example, a base station (BS). For example, a network device, such as the BS 700, may utilize one or more components, such as the processor 702, the memory 704, the Collision Avoidance Module 708, the transceiver 710, the modem 712, and the one or more antennas 716, to execute the steps of method 900. The method 900 may employ similar mechanisms as described above in FIGS. 1-5. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the BS transmits, to a UE on a DDS, system information indicating a first DDS paging configuration. In some aspects, transmitting the system information includes transmitting a SIB message (e.g., SIB1) indicating parameters for monitoring for paging messages. The system information may indicate one or more serving cells, SSB configurations, and/or any other suitable parameter. In some aspects, block 910 includes transmitting a temporary identifier, such as a GUTI and/or a TMSI. The UE may determine the timing parameters for page monitoring based on the temporary identifier (e.g., 5G-S-TMSI), as explained above.

At block 920, the BS receives, from the UE on the DDS, a registration update request based on the first DDS paging configuration and a n-DDS paging configuration. In this regard, the UE may determine, detect, or predict, based on the first DDS paging configuration and the n-DDS paging configuration, a potential paging collision for page occasions of the n-DDS and the DDS. In an exemplary aspect, the actions of block 920 are performed by the BS while the UE is in the connected mode. For example, the connected mode may be RRC_CONNECTED.

In some aspects, receiving the registration update request includes receiving a RRC message from the UE on the DDS. For example, block 920 may include receiving a mobility registration update (MRU) from the UE. The registration update request may prompt the network to assign a new temporary identifier (e.g., GUTI) to the UE.

At block 930, the BS transmits, to the UE based on the registration update request, a registration update. In some aspects, transmitting the registration update includes transmitting a new GUTI from the network. In some aspects, the GUTI may include or indicate a TMSI. Based on the TMSI, the BS may determine or update page transmission configurations or parameters.

At block 940, the BS transmits, to the UE on the DDS, a paging message based on a second DDS paging configuration different from the first DDS paging configuration, where the second DDS paging configuration is based on the registration update. In some aspects, the BS transmits the paging message after the UE enters an idle mode for the DDS. In some aspects, the BS may transmit the paging message based on an updated GUTI provided by the network at block 930. In some aspects, transmitting the paging message may include transmitting downlink control information (DCI) encoded by P-RNTI, for example. The encoded information in the PDCCH may indicate the time/frequency resources of the paging message in a PDSCH, or in the PDCCH.

RECITATIONS OF VARIOUS ASPECTS OF THE PRESENT DISCLOSURE

Aspect 1. A method of wireless communication performed by a user equipment (UE), the method comprising: monitoring, on a non-dedicated data subscription (n-DDS) of the UE, for one or more first paging messages based on a first paging configuration; receiving, from a network device on a dedicated data subscription (DDS) of the UE, system information indicating a second paging configuration; and transmitting, to the network device on the DDS, a registration update request based on the first paging configuration and the second paging configuration; receiving, from the network device based on the registration update request, a registration update; and monitoring, on the DDS of the UE, for one or more second paging messages based on a third paging configuration different from the second paging configuration, wherein the third paging configuration is based on the registration update.

Aspect 2. The method of aspect 1, further comprising: detecting, based on the first paging configuration and the second paging configuration while the DDS is in a connected mode, a first potential paging collision, wherein the transmitting the registration update request is based on detecting the first potential paging collision.

Aspect 3. The method of aspect 2, further comprising: initiating, while the DDS is in a connected mode with a first cell, a handover procedure for communicating with a second cell different from the first cell, wherein the detecting the first potential paging collision comprises detecting the first potential paging collision on the second cell.

Aspect 4. The method of any of aspects 2-3, further comprising: detecting, based on the first paging configuration and the third paging configuration, a second potential paging collision; transmitting, to the network device based on the second potential paging collision, a second registration update request; receiving, from the network device based on the second registration update request, a second registration update; and monitoring, on the DDS, for the one or more second paging messages based on a fourth paging configuration different from the third paging configuration, wherein the fourth paging configuration is based on the second registration update.

Aspect 5. The method of any of aspects 2-3, further comprising: entering, by the DDS, an idle mode; detecting, based on the first paging configuration and the third paging configuration, a second potential paging collision, wherein the third paging configuration is associated with a first synchronization signal block (SSB), and wherein the first SSB is associated with a first beam direction; and monitoring, on the DDS, for the one or more second paging messages based on a second SSB associated with a second beam direction different from the first beam direction.

Aspect 6. The method of any of aspects 2-3, further comprising: entering, by the DDS, an idle mode; detecting, based on the first paging configuration and the third paging configuration, a second potential paging collision, wherein the first paging configuration is associated with a first synchronization signal block (SSB), and wherein the first SSB is associated with a first beam direction; and monitoring, on the n-DDS, for the one or more first paging messages based on a second SSB associated with a second beam direction different from the first beam direction.

Aspect 7. The method of any of aspects 1-6, wherein the transmitting the registration update request comprises transmitting a mobility registration update (MRU) message.

Aspect 8. The method of any of aspects 1-7, wherein: the second paging configuration is associated with a first global unique temporary identifier (GUTI); and the receiving the registration update comprises receiving an indication of a second GUTI different from the first GUTI.

Aspect 9. The method of aspect 8, further comprising: determining, based on the second GUTI, the second paging configuration.

Aspect 10. The method of any of aspects 1-9, wherein the third paging configuration comprises: one or more system frame numbers (SFNs) for one or more paging frames; and one or more indices for one or more paging occasions.

Aspect 11. A user equipment (UE), comprising: a processor and a transceiver in communication with the processor, wherein the processor and the transceiver are configured to: monitor, on a non-dedicated data subscription (n-DDS) of the UE, for one or more first paging messages based on a first paging configuration; receive, from a network device on a dedicated data subscription (DDS) of the UE, system information indicating a second paging configuration; and transmit, to the network device on the DDS, a registration update request based on the first paging configuration and the second paging configuration; receive, from the network device based on the registration update request, a registration update; and monitor, on the DDS of the UE, for one or more second paging messages based on a third paging configuration different from the second paging configuration, wherein the third paging configuration is based on the registration update.

Aspect 12. The UE of aspect 11, wherein the processor and the transceiver are further configured to: detect, based on the first paging configuration and the second paging configuration while the DDS is in a connected mode, a first potential paging collision, wherein the processor and the transceiver are configured to transmit the registration update request based on detecting the first potential paging collision.

Aspect 13. The UE of aspect 12, wherein the processor and the transceiver are further configured to: initiate, while the DDS is in a connected mode with a first cell, a handover procedure for communicating with a second cell different from the first cell, wherein the processor and the transceiver are configured to detect the first potential paging collision on the second cell.

Aspect 14. The UE of any of aspects 12-13, wherein the processor and the transceiver are further configured to: detect, based on the first paging configuration and the third paging configuration, a second potential paging collision; transmit, to the network device based on the second potential paging collision, a second registration update request; receive, from the network device based on the second registration update request, a second registration update; and monitor, on the DDS, for the one or more second paging messages based on a fourth paging configuration different from the third paging configuration, wherein the fourth paging configuration is based on the second registration update.

Aspect 15. The UE of any of aspects 12-13, wherein the processor and the transceiver are further configured to: enter, by the DDS, an idle mode; detect, based on the first paging configuration and the third paging configuration, a second potential paging collision, wherein the third paging configuration is associated with a first synchronization signal block (SSB), and wherein the first SSB is associated with a first beam direction; and monitor, on the DDS, for the one or more second paging messages based on a second SSB associated with a second beam direction different from the first beam direction.

Aspect 16. The UE of any of aspects 12-13, wherein the processor and the transceiver are further configured to: enter, by the DDS, an idle mode; detect, based on the first paging configuration and the third paging configuration, a second potential paging collision, wherein the first paging configuration is associated with a first synchronization signal block (SSB), and wherein the first SSB is associated with a first beam direction; and monitor, on the n-DDS, for the one or more first paging messages based on a second SSB associated with a second beam direction different from the first beam direction.

Aspect 17. The UE of any of aspects 11-16, wherein the processor and the transceiver are configured to transmit the registration update request by transmitting a mobility registration update (MRU) message.

Aspect 18. The UE of any of aspects 11-17, wherein: the second paging configuration is associated with a first global unique temporary identifier (GUTI); and the processor and the transceiver are configured to receive the registration update by receiving an indication of a second GUTI different from the first GUTI.

Aspect 19. The UE of aspect 18, wherein the processor and the transceiver are further configured to: determine, based on the second GUTI, the second paging configuration.

Aspect 20. The UE of any of aspects 11-19, wherein the third paging configuration comprises: one or more system frame numbers (SFNs) for one or more paging frames; and one or more indices for one or more paging occasions.

Aspect 21. A non-transitory, computer-readable medium having program code recorded thereon, wherein the program code comprises instructions executable by a user equipment (UE) to cause the UE to: monitor, on a non-dedicated data subscription (n-DDS) of the UE, for one or more first paging messages based on a first paging configuration; receive, from a network device on a dedicated data subscription (DDS) of the UE, system information indicating a second paging configuration; and transmit, to the network device on the DDS, a registration update request based on the first paging configuration and the second paging configuration; receive, from the network device based on the registration update request, a registration update; and monitor, on the DDS of the UE, for one or more second paging messages based on a third paging configuration different from the second paging configuration, wherein the third paging configuration is based on the registration update.

Aspect 22. A user equipment (UE), comprising: means for monitoring, on a non-dedicated data subscription (n-DDS) of the UE, for one or more first paging messages based on a first paging configuration; means for receiving, from a network device on a dedicated data subscription (DDS) of the UE, system information indicating a second paging configuration; and means for transmitting, to the network device on the DDS, a registration update request based on the first paging configuration and the second paging configuration; means for receiving, from the network device based on the registration update request, a registration update; and means for monitoring, on the DDS of the UE, for one or more second paging messages based on a third paging configuration different from the second paging configuration, wherein the third paging configuration is based on the registration update.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), the method comprising:
   monitoring, on a non-dedicated data subscription (n-DDS) of the UE, for one or more first paging messages based on a first paging configuration;
   receiving, from a network device on a dedicated data subscription (DDS) of the UE, system information indicating a second paging configuration; and
   transmitting, to the network device on the DDS, a registration update request based on the first paging configuration and the second paging configuration;
   receiving, from the network device based on the registration update request, a registration update; and
   monitoring, on the DDS of the UE, for one or more second paging messages based on a third paging configuration different from the second paging configuration, wherein the third paging configuration is based on the registration update.

2. The method of claim 1, further comprising:
   detecting, based on the first paging configuration and the second paging configuration while the DDS is in a connected mode, a first potential paging collision,
   wherein the transmitting the registration update request is based on detecting the first potential paging collision.

3. The method of claim 2, further comprising:
   initiating, while the DDS is in a connected mode with a first cell, a handover procedure for communicating with a second cell different from the first cell,
   wherein the detecting the first potential paging collision comprises detecting the first potential paging collision on the second cell.

4. The method of claim 2, further comprising:
   detecting, based on the first paging configuration and the third paging configuration, a second potential paging collision;
   transmitting, to the network device based on the second potential paging collision, a second registration update request;
   receiving, from the network device based on the second registration update request, a second registration update; and
   monitoring, on the DDS, for the one or more second paging messages based on a fourth paging configuration different from the third paging configuration, wherein the fourth paging configuration is based on the second registration update.

5. The method of claim 2, further comprising:
   entering, by the DDS, an idle mode;
   detecting, based on the first paging configuration and the third paging configuration, a second potential paging collision, wherein the third paging configuration is associated with a first synchronization signal block (SSB), and wherein the first SSB is associated with a first beam direction; and
   monitoring, on the DDS, for the one or more second paging messages based on a second SSB associated with a second beam direction different from the first beam direction.

6. The method of claim 2, further comprising:
   entering, by the DDS, an idle mode;
   detecting, based on the first paging configuration and the third paging configuration, a second potential paging collision, wherein the first paging configuration is associated with a first synchronization signal block (SSB), and wherein the first SSB is associated with a first beam direction; and
   monitoring, on the n-DDS, for the one or more first paging messages based on a second SSB associated with a second beam direction different from the first beam direction.

7. The method of claim 1, wherein the transmitting the registration update request comprises transmitting a mobility registration update (MRU) message.

8. The method of claim 1, wherein:
   the second paging configuration is associated with a first global unique temporary identifier (GUTI); and
   the receiving the registration update comprises receiving an indication of a second GUTI different from the first GUTI.

9. The method of claim 8, further comprising:
   determining, based on the second GUTI, the second paging configuration.

10. The method of claim 1, wherein the third paging configuration comprises:
    one or more system frame numbers (SFNs) for one or more paging frames; and
    one or more indices for one or more paging occasions.

11. A user equipment (UE), comprising:
    a memory;
    a transceiver; and
    at least one processor operatively coupled to the memory and the transceiver and configured to:
       monitor, on a non-dedicated data subscription (n-DDS) of the UE, for one or more first paging messages based on a first paging configuration;
       receive, from a network device on a dedicated data subscription (DDS) of the UE, system information indicating a second paging configuration; and
       transmit, to the network device on the DDS, a registration update request based on the first paging configuration and the second paging configuration;
       receive, from the network device based on the registration update request, a registration update; and
       monitor, on the DDS of the UE, for one or more second paging messages based on a third paging configuration different from the second paging configuration, wherein the third paging configuration is based on the registration update.

12. The UE of claim 11, wherein the processor is further configured to:
detect, based on the first paging configuration and the second paging configuration while the DDS is in a connected mode, a first potential paging collision, wherein the processor is configured to transmit the registration update request based on detecting the first potential paging collision.

13. The UE of claim 12, wherein the processor is further configured to:
initiate, while the DDS is in a connected mode with a first cell, a handover procedure for communicating with a second cell different from the first cell,
wherein the processor is configured to detect the first potential paging collision on the second cell.

14. The UE of claim 12, wherein the processor is further configured to:
detect, based on the first paging configuration and the third paging configuration, a second potential paging collision;
transmit, to the network device based on the second potential paging collision, a second registration update request;
receive, from the network device based on the second registration update request, a second registration update; and
monitor, on the DDS, for the one or more second paging messages based on a fourth paging configuration different from the third paging configuration, wherein the fourth paging configuration is based on the second registration update.

15. The UE of claim 12, wherein the processor is further configured to:
enter, by the DDS, an idle mode;
detect, based on the first paging configuration and the third paging configuration, a second potential paging collision, wherein the third paging configuration is associated with a first synchronization signal block (SSB), and wherein the first SSB is associated with a first beam direction; and
monitor, on the DDS, for the one or more second paging messages based on a second SSB associated with a second beam direction different from the first beam direction.

16. The UE of claim 12, wherein the processor is further configured to:
enter, by the DDS, an idle mode;
detect, based on the first paging configuration and the third paging configuration, a second potential paging collision, wherein the first paging configuration is associated with a first synchronization signal block (SSB), and wherein the first SSB is associated with a first beam direction; and
monitor, on the n-DDS, for the one or more first paging messages based on a second SSB associated with a second beam direction different from the first beam direction.

17. The UE of claim 11, wherein the processor is configured to transmit the registration update request by transmitting a mobility registration update (MRU) message.

18. The UE of claim 11, wherein:
the second paging configuration is associated with a first global unique temporary identifier (GUTI); and
the processor is configured to receive the registration update by receiving an indication of a second GUTI different from the first GUTI.

19. The UE of claim 18, wherein the processor is further configured to:
determine, based on the second GUTI, the second paging configuration.

20. The UE of claim 11, wherein the third paging configuration comprises:
one or more system frame numbers (SFNs) for one or more paging frames; and
one or more indices for one or more paging occasions.

21. A non-transitory, computer-readable medium having program code recorded thereon, wherein the program code comprises instructions executable by a user equipment (UE) to cause the UE to:
monitor, on a non-dedicated data subscription (n-DDS) of the UE, for one or more first paging messages based on a first paging configuration;
receive, from a network device on a dedicated data subscription (DDS) of the UE, system information indicating a second paging configuration; and
transmit, to the network device on the DDS, a registration update request based on the first paging configuration and the second paging configuration;
receive, from the network device based on the registration update request, a registration update; and
monitor, on the DDS of the UE, for one or more second paging messages based on a third paging configuration different from the second paging configuration, wherein the third paging configuration is based on the registration update.

22. The non-transitory, computer-readable medium of claim 21, wherein the program code further comprises code for causing the UE to:
detect, based on the first paging configuration and the second paging configuration while the DDS is in a connected mode, a first potential paging collision, wherein the code for causing the UE to transmit the registration update request is based on detecting the first potential paging collision.

23. The non-transitory, computer-readable medium of claim 22, wherein the program code further comprises code for causing the UE to:
initiate, while the DDS is in a connected mode with a first cell, a handover procedure for communicating with a second cell different from the first cell,
wherein the code for causing the UE to detect the first potential paging collision comprises code for causing the UE to detect the first potential paging collision on the second cell.

24. The non-transitory, computer-readable medium of claim 22, wherein the program code further comprises code for causing the UE to:
detect, based on the first paging configuration and the third paging configuration, a second potential paging collision;
transmit, to the network device based on the second potential paging collision, a second registration update request;
receive, from the network device based on the second registration update request, a second registration update; and
monitor, on the DDS, for the one or more second paging messages based on a fourth paging configuration different from the third paging configuration, wherein the fourth paging configuration is based on the second registration update.

25. The non-transitory, computer-readable medium of claim 22, wherein the program code further comprises code for causing the UE to:
    enter, by the DDS, an idle mode;
    detect, based on the first paging configuration and the third paging configuration, a second potential paging collision, wherein the third paging configuration is associated with a first synchronization signal block (SSB), and wherein the first SSB is associated with a first beam direction; and
    monitor, on the DDS, for the one or more second paging messages based on a second SSB associated with a second beam direction different from the first beam direction.

26. The non-transitory, computer-readable medium of claim 22, wherein the program code further comprises code for causing the UE to:
    enter, by the DDS, an idle mode;
    detect, based on the first paging configuration and the third paging configuration, a second potential paging collision, wherein the first paging configuration is associated with a first synchronization signal block (SSB), and wherein the first SSB is associated with a first beam direction; and
    monitor, on the n-DDS, for the one or more first paging messages based on a second SSB associated with a second beam direction different from the first beam direction.

27. The non-transitory, computer-readable medium of claim 21, wherein the code for causing the UE to transmit the registration update request comprises code for causing the UE to transmit a mobility registration update (MRU) message.

28. The non-transitory, computer-readable medium of claim 21, wherein:
    the second paging configuration is associated with a first global unique temporary identifier (GUTI); and
    the code for causing the UE to receive the registration update comprises code for causing the UE to receive an indication of a second GUTI different from the first GUTI.

29. The non-transitory, computer-readable medium of claim 28, wherein the program code further comprises code for causing the UE to:
    determine, based on the second GUTI, the second paging configuration.

30. A user equipment (UE), comprising:
    means for monitoring, on a non-dedicated data subscription (n-DDS) of the UE, for one or more first paging messages based on a first paging configuration;
    means for receiving, from a network device on a dedicated data subscription (DDS) of the UE, system information indicating a second paging configuration; and
    means for transmitting, to the network device on the DDS, a registration update request based on the first paging configuration and the second paging configuration;
    means for receiving, from the network device based on the registration update request, a registration update; and
    means for monitoring, on the DDS of the UE, for one or more second paging messages based on a third paging configuration different from the second paging configuration, wherein the third paging configuration is based on the registration update.

* * * * *